United States Patent
Sjoholm

(10) Patent No.: US 11,813,925 B2
(45) Date of Patent: Nov. 14, 2023

(54) METHODS AND SYSTEMS FOR MAINTAINING CARGO AT AN ULTRA-LOW TEMPERATURE OVER AN EXTENDED PERIOD OF TIME

(71) Applicant: THERMO KING LLC, Minneapolis, MN (US)

(72) Inventor: Lars I. Sjoholm, Burnsville, MN (US)

(73) Assignee: THERMO KING LLC, Minneapolis, MN (US)

( * ) Notice: Subject to any disclaimer, the term of this patent is extended or adjusted under 35 U.S.C. 154(b) by 0 days.

(21) Appl. No.: 17/487,691

(22) Filed: Sep. 28, 2021

(65) Prior Publication Data
US 2022/0097486 A1 Mar. 31, 2022

Related U.S. Application Data

(60) Provisional application No. 63/084,202, filed on Sep. 28, 2020.

(51) Int. Cl.
*B60H 1/32* (2006.01)
*B60H 1/00* (2006.01)

(52) U.S. Cl.
CPC ....... *B60H 1/3228* (2019.05); *B60H 1/00364* (2013.01)

(58) Field of Classification Search
CPC B60H 1/3228; B60H 1/3232; B60H 1/00364; B60H 1/005; B60H 1/00014;
(Continued)

(56) References Cited

U.S. PATENT DOCUMENTS 3,939,668 A * 2/1976 Morris .................. F25B 49/027
62/196.4
4,060,400 A 11/1977 Williams
(Continued)

FOREIGN PATENT DOCUMENTS

DE 202006018472 2/2007
DE 102008047753 3/2010
(Continued)

OTHER PUBLICATIONS

CTC Climate Testing Systems, "−70° C. Freezers Ultra-Low Temperature Walk-In Freezer", 2 pages, available online at: climatictesting.com/product/environmental-rooms/70-c-freezers/ (2018).
(Continued)

*Primary Examiner* — Marc E Norman
(74) *Attorney, Agent, or Firm* — Hamre, Schumann, Mueller & Larson, P.C.

(57) ABSTRACT

A transport climate control system to cost-effectively maintain an ultra-low temperature over an extended period of time is provided. The transport climate control system includes a primary climate control system and a secondary climate control system. The primary climate control system includes a first compressor, a first condenser, a first expander, and a main evaporator that is configured to thermally communicate with a climate controlled space. The secondary climate control system includes an ultra-low temperature phase changing medium packaged inside or outside of an enclosure for a cargo. The secondary climate control system is configured to thermally communicate with the climate controlled space, the primary climate control system, and the cargo to provide additional or backup climate control capacity at the ultra-low temperature.

18 Claims, 16 Drawing Sheets

(58) Field of Classification Search
CPC ........ F25B 40/00; F25B 7/00; F25B 2400/13; F25B 2400/0405; F25B 2400/0417; F25B 2400/054; F25D 11/003
See application file for complete search history.

(56) References Cited

U.S. PATENT DOCUMENTS

| | | |
|---|---|---|
| 5,410,886 A | 5/1995 | Wallace et al. |
| RE45,967 E | 4/2016 | Owen et al. |
| 9,908,452 B2 | 3/2018 | Senf, Jr. et al. |
| 10,543,737 B2 | 1/2020 | Kujak et al. |
| 2009/0019861 A1 | 1/2009 | Heckt et al. |
| 2015/0314671 A1* | 11/2015 | Rajtmajer ............... B60H 1/005 62/99 |
| 2016/0144763 A1 | 5/2016 | Vander Woude et al. |
| 2018/0017292 A1* | 1/2018 | Yana Motta ............ F25B 40/00 |
| 2018/0073791 A1* | 3/2018 | Sun ........................ F25B 49/027 |
| 2018/0252466 A1* | 9/2018 | Baker ........................ B01L 7/52 |
| 2019/0212038 A1* | 7/2019 | Senf, Jr. ............. B60H 1/00014 |
| 2021/0088390 A1* | 3/2021 | Kriss ........................ F24F 11/63 |

FOREIGN PATENT DOCUMENTS

| | | |
|---|---|---|
| DE | 202011101179 | 8/2012 |
| JP | 4130121 | 8/2008 |

OTHER PUBLICATIONS

Extended European Search Report, issued in the corresponding European patent application No. 21199609.5, dated Feb. 25, 2022, 7 pages.

* cited by examiner

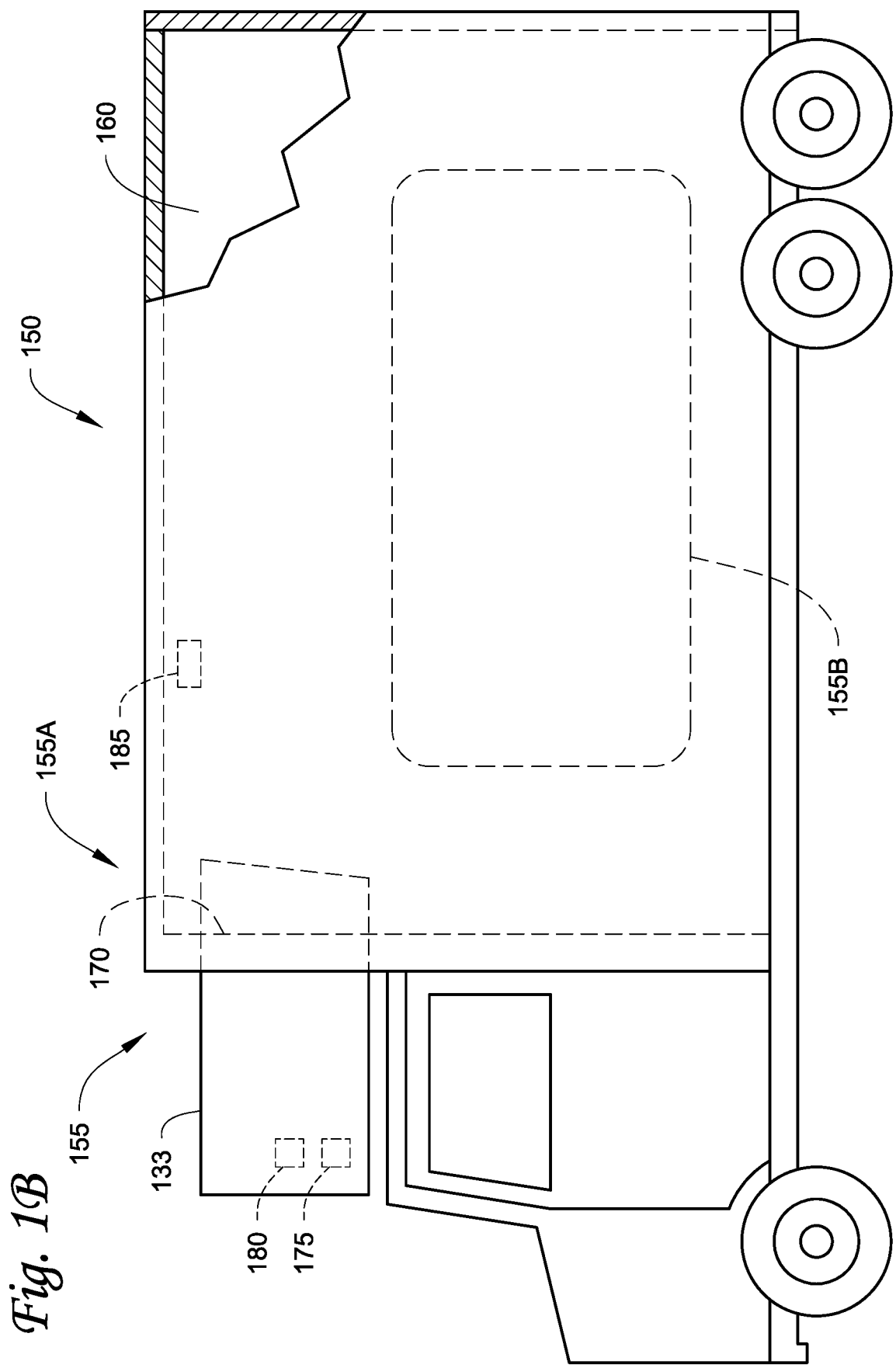

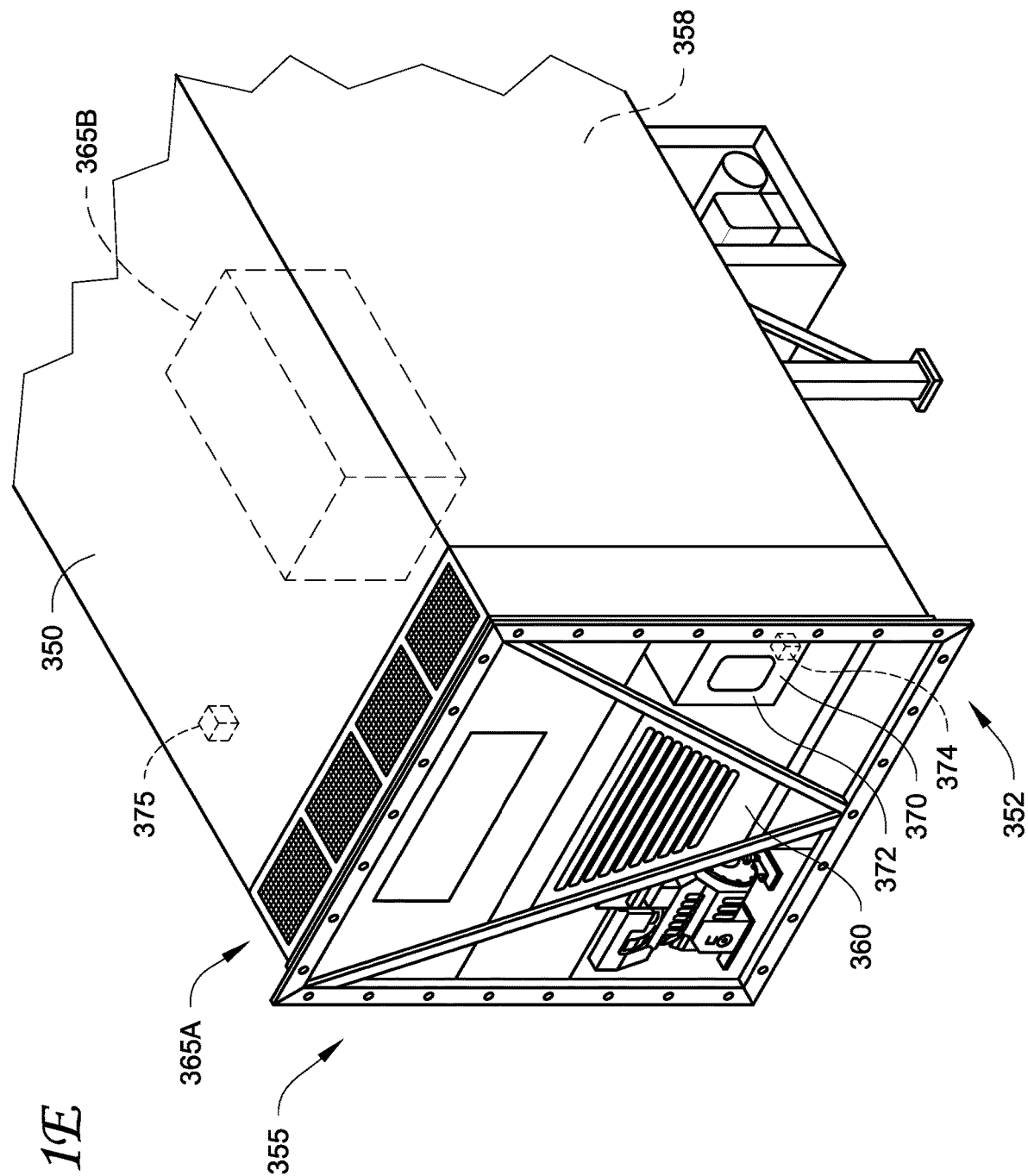

METHODS AND SYSTEMS FOR MAINTAINING CARGO AT AN ULTRA-LOW TEMPERATURE OVER AN EXTENDED PERIOD OF TIME

FIELD

This disclosure relates generally to a transport climate control system. More specifically, this disclosure relates to transport climate control systems capable of cost-effectively maintaining a cargo at an ultra-low temperature over an extended period of time.

BACKGROUND

A transport climate control system is generally used to control one or more environmental conditions such as, but not limited to, temperature, humidity, air quality, or combinations thereof, of a transport unit. Examples of transport units include, but are not limited to, a truck, a container (such as a container on a flat car, an intermodal container, a marine container, etc.), a box car, a semi-tractor, a bus, or other similar transport unit. A refrigerated transport unit is commonly used to transport perishable items such as produce, frozen foods, meat products, pharmaceuticals, and vaccines.

SUMMARY

The embodiments described herein are directed to methods and systems for cost-effectively maintaining a cargo at an ultra-low temperature over an extended period of time.

Certain perishable cargos (e.g., virus, bacteria, eukaryotic cells, blood, mRNA material, etc.) may be required to be transported cost-effectively at an ultra-low temperature between, for example, −30° C. to −80° C., −40° C. to −80° C., etc. However, a stand-alone vapor-compression type climate control system or a stand-alone sublimating/evaporative climate control system by themselves may be unfeasible due to cost and/or safety reasons. The embodiments described herein can provide a transport climate control system having a primary climate control system combined with a secondary climate control system to cost effectively maintain a cargo at an ultra-low temperature.

According to an embodiment, a transport climate control system to cost-effectively maintain an ultra-low temperature over an extended period of time is provided. The transport climate control system includes a primary climate control system and a secondary climate control system. The primary climate control system is configured to thermally communicate with a climate controlled space and includes a first compressor, a first condenser, a first expander, and a main evaporator. The secondary climate control system includes an ultra-low temperature phase changing medium packaged inside or outside of an enclosure for a cargo. The secondary climate control system is configured to thermally communicate with the climate controlled space, the primary climate control system, and the cargo to provide additional or backup climate control capacity at the ultra-low temperature.

BRIEF DESCRIPTION OF THE DRAWINGS

References are made to the accompanying drawings that form a part of this disclosure, and which illustrate embodiments in which the systems and methods described in this Specification can be practiced.

FIG. 1B is a side view of a truck with a transport climate control system, according to an embodiment.

FIG. 1E is a perspective view of a climate controlled transport unit, according to an embodiment.

Like reference numbers represent like parts throughout.

DETAILED DESCRIPTION

Figure 1A:
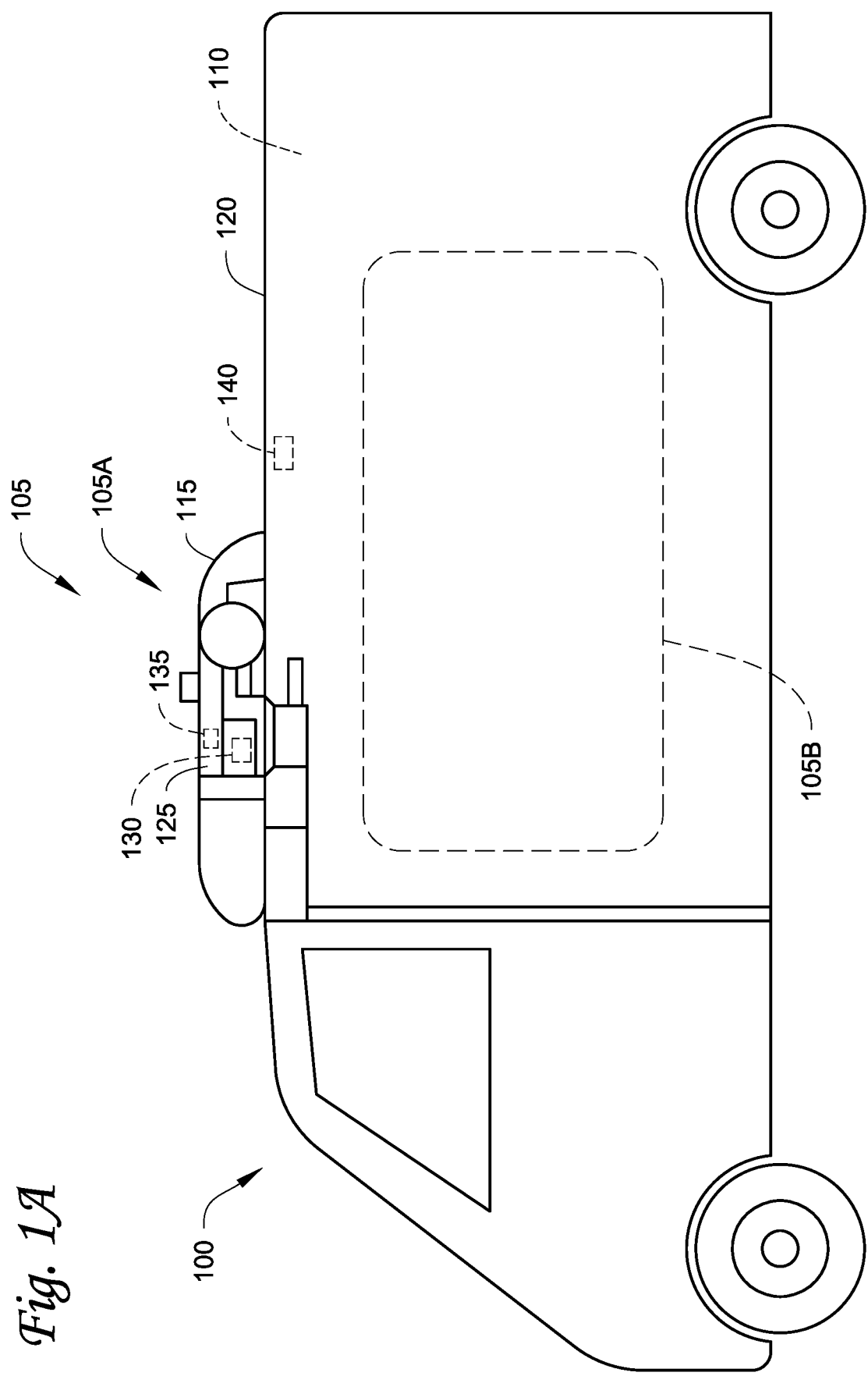
FIG. 1A is a side view of a van with a transport climate control system, according to an embodiment.

This disclosure relates generally to a transport climate control system. More specifically, this disclosure relates to transport climate control systems having a primary climate control system in thermal communication with a secondary climate control system in order to cost-effectively maintain a product at an ultra-low temperature over an extended period of time.

A transport unit includes, for example, a truck, a van, a container (such as a container on a flat car, an intermodal container, a marine container, etc.), a box car, a semi-tractor, a bus, or other similar transport unit. Embodiments of this disclosure may be used in any suitable environmentally controlled transport unit.

A climate-controlled transport unit (e.g., a transport unit including a transport climate control system) can be used to transport perishable items such as, but not limited to, pharmaceuticals, biological samples produce, frozen foods, and meat products.

Certain perishable cargos may be required to be transported cost-effectively at an ultra-low temperature. An ultra-low temperature is defined herein as a temperature that can preserve biological materials (e.g., virus, bacteria, eukaryotic cells, blood, mRNA material, etc.). For example, in some embodiments an ultra-low temperature may be between −30° C. to −80° C. In some embodiments, the ultra-low temperature may be between −40° C. to −80° C.

A transport climate control system is generally used to control one or more environmental conditions such as, but not limited to, temperature, humidity, and/or air quality within a climate controlled space of a transport unit.

The transport climate control system can include a climate control unit (CCU) attached to a transport unit to control one or more environmental conditions (e.g., temperature, humidity, air quality, etc.) of the climate controlled space of the transport unit. The CCU can include one or more components of a vapor-compression type climate control system that includes, for example, a compressor, a condenser, an expansion valve, an evaporator, and one or more fans or blowers to control the heat exchange between the air within the climate controlled space and the ambient air outside of the transport unit.

The vapor-compression type climate control system may cost-effectively provide a continuous cooling capacity within a defined temperature range. However, in some embodiments, the vapor-compression type climate control system may not be capable of providing sufficient cooling to reach an ultra-low temperature range within the climate controlled space. Also, in some embodiments, the cost for configuring a vapor-compression type climate control system to provide sufficient cooling capacity to reach an ultra-low temperature range may be too high due to, for example, the cost of low temperature working fluids (e.g., refrigerants) and the equipment associated with operating the lower temperature working fluid. The working fluid, as described herein, can alternatively be referred to as a heat transfer fluid or medium.

In some embodiments, a sublimating/evaporative climate control system that includes an ultra-low temperature phase changing medium that can maintain an ultra-low temperature within a climate controlled space. However, relying on an ultra-low temperature phase changing media may be unfeasible over a long period of time within a climate controlled space for cost and safety reasons. For example, a large quantity of dry ice may be expensive, occupy valuable cargo space within the climate controlled space, and create a substantial amount of gaseous carbon dioxide displacing air within the climate controlled space that may be unhealthy for anyone entering into the climate controlled space. In some embodiments, the ultra-low temperature phase changing medium can be a sublimating/evaporative medium such as, for example, dry ice, liquid nitrogen, etc.

Figure 1C:
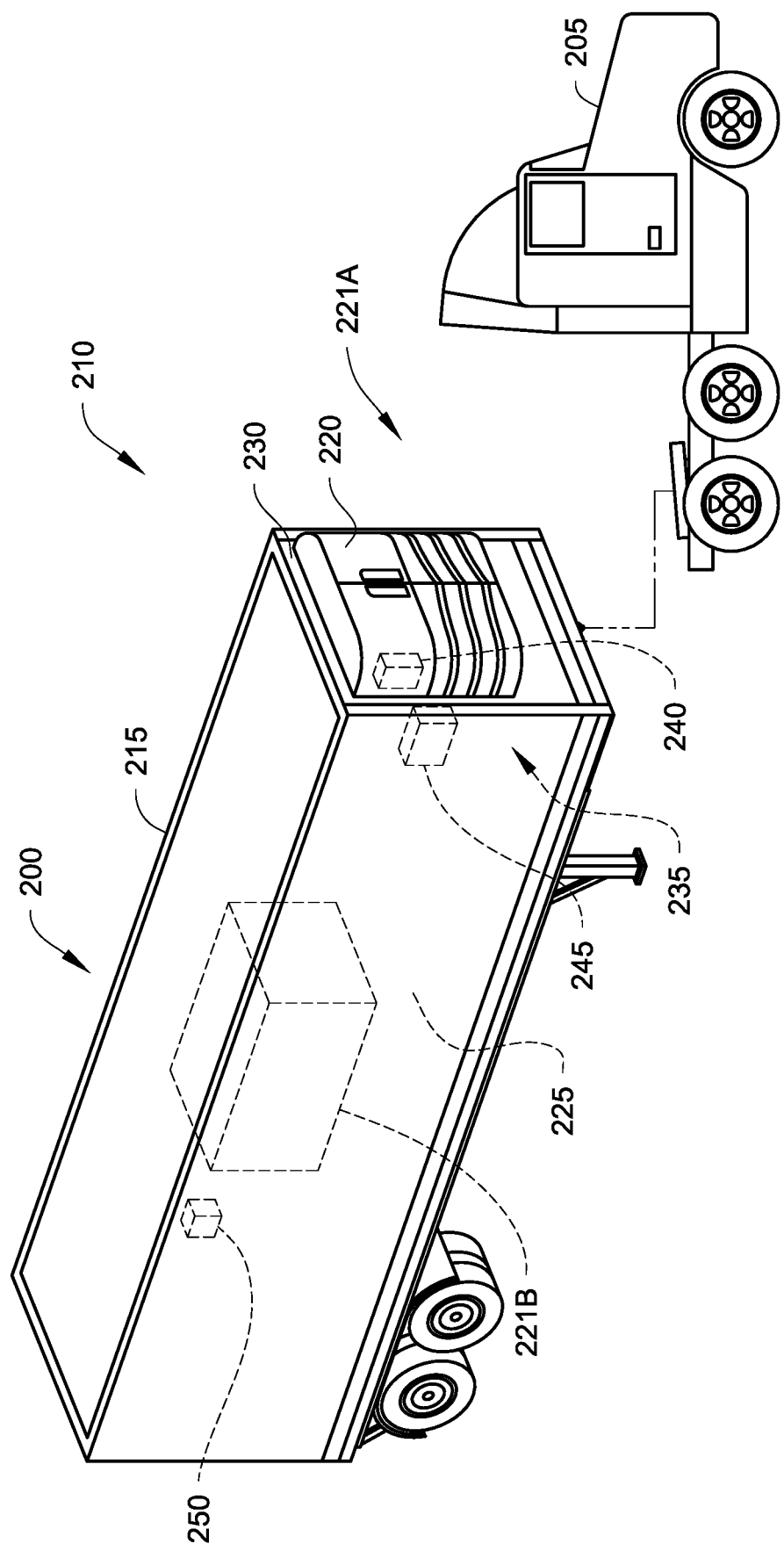
FIG. 1C is a perspective view of a climate-controlled transport unit, according to an embodiment.
Figure 1D:
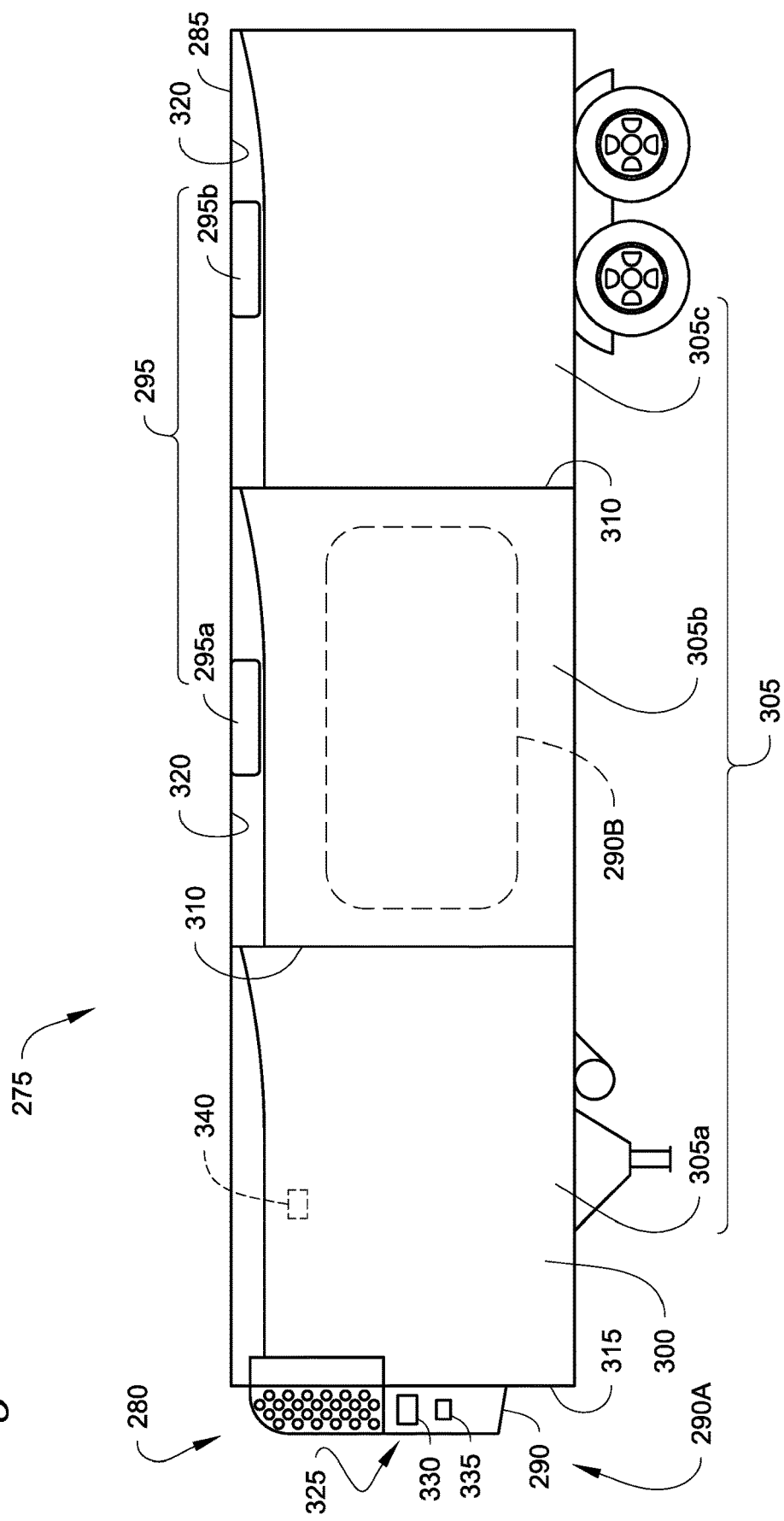
FIG. 1D is a side view of a climate-controlled transport unit including a multi-zone transport climate control system, according to an embodiment.

FIGS. 1A-1E show various embodiments of a transport climate control system. FIG. 1A is a side view of a van 100 with a transport climate control system 105, according to an embodiment. FIG. 1B is a side view of a truck 150 with a transport climate control system 155, according to an embodiment. FIG. 1C is a perspective view of a climate-controlled transport unit 200 attachable to a tractor 205, according to an embodiment. The climate-controlled transport unit 200 includes a transport climate control system 210. FIG. 1D is a side view of a climate-controlled transport unit 275 including a multi-zone transport climate control system 280, according to an embodiment. FIG. 1E is a perspective view of an intermodal container 350 with a transport climate control system 355.

FIG. 1A depicts the van 100 having the transport climate control system 105 for providing climate control within a climate-controlled space 110. The transport climate control system 105 includes a climate control unit (CCU) 115 that is mounted to a rooftop 120 of the van 100. In an embodiment, the CCU 115 can be a transport refrigeration unit.

The transport climate control system 105 can include, among other components, a primary climate control system 105A and a secondary climate control system 105B that are in thermal communication with the climate-controlled space 110. The primary climate control system 105A can include a climate control circuit that connects, for example, a compressor, a condenser, an evaporator, and an expander (e.g., an expansion valve or other expansion devices) to provide climate control within the climate controlled space 110. As defined herein, an expander can be an expansion valve or any other type of expansion device that is configured to control an amount of working fluid passing there through and thereby regulate the superheat of vapor leaving an evaporator. The expander may or may not be configured to generate power. In some embodiments, the climate control circuit can be a single stage climate control circuit (see FIGS. 3A and 3B) or a cascade climate control circuit (see FIGS. 3C-3F). The transport climate control system 105, including the primary climate control system 105A and the secondary climate control system 105B, is configured to provide climate control within the climate-controlled space 110 to maintain an ultra-low temperature.

The CCU 115 can include portions or all of the primary climate control system 105A including, for example, the compressor, the condenser, the evaporator, and the expansion device.

The secondary climate control system 105B is provided within the climate controlled space 110 and can provide backup or additional cooling capacity for cargo being stored in the climate-controlled space 110. The secondary climate control system 105B is a sublimating/evaporative climate control system that can provide backup or additional cooling capacity using an ultra-low phase changing medium releasing or absorbing thermal energy from the climate controlled space. In some embodiments, the ultra-low phase changing medium can be a sublimating/evaporative medium such as, for example, dry ice, liquid nitrogen, etc.

It will be appreciated that the embodiments described herein are not limited to vans or climate-controlled vans, but can apply to any type of transport unit (e.g., a truck, a container (such as a container on a flat car, an intermodal container, a marine container, etc.), a box car, a semi-tractor, a bus, or other similar transport unit), within the scope of the principles of this disclosure.

The transport climate control system 105 also includes a programmable climate controller 125 and one or more climate control sensors (not shown) that are configured to measure one or more parameters of the transport climate control system 105 (e.g., an ambient temperature outside of the van 100, an ambient humidity outside of the van 100, a compressor suction pressure, a compressor discharge pressure, a supply air temperature of air supplied by the CCU 115 into the climate controlled space 110, a return air temperature of air returned from the climate controlled space 110 back to the CCU 115, a humidity within the climate controlled space 110, etc.) and communicate the measured parameters to the climate controller 125. The one or more climate control sensors can be positioned at various locations outside the van 100 and/or inside the van 100 (including within the climate-controlled space 110).

The climate controller 125 is configured to control operation of the transport climate control system 105 including one or more components of the primary climate control system 105A. The climate controller 115 may include a single integrated control unit 130 or may include a distributed network of climate controller elements 130, 135. The number of distributed control elements in a given network can depend upon the particular application of the principles of this disclosure. The measured parameters obtained by the one or more climate control sensors can be used by the climate controller 125 to control operation of the transport climate control system 105.

The van 100 includes a sensor 140. In the illustrated embodiment, the sensor 140 is represented as a single sensor. It will be appreciated that in other embodiments, the van 100 can include a plurality of sensors 140. In some embodiments, the sensor 140 can monitor one or more climate control parameters (e.g., temperature, humidity, atmosphere, etc.) within the climate-controlled space 110 or just outside the van 100. The sensor 140 can be used by the climate controller 125 to control operation of the transport climate control system 105. The sensor 140 can be in electronic communication with a power source (not shown) of the CCU 115. In an embodiment, the sensor 140 can be in electronic communication with the climate controller 125. It will be appreciated that the electronic communication between the sensor 140 and the climate controller 125 can enable network communication of the sensed climate control parameters measured by the sensor 140. The electronic communication between the climate controller 125 and the sensor 140 can enable the sensed climate control parameters to be utilized in a control of the CCU 115.

FIG. 1B depicts the climate-controlled straight truck 150 that includes the climate-controlled space 160 for carrying cargo and the transport climate control system 155. The transport climate control system 155 can include, among other components, a primary climate control system 155A and a secondary climate control system 155B that are in thermal communication with the climate-controlled space 160. The primary climate control system 155A can include a climate control circuit that connects, for example, a compressor, a condenser, an evaporator, and an expander (e.g., an expansion valve or other expansion devices) to provide climate control within the climate controlled space 160. In some embodiments, the climate control circuit can be a single stage climate control circuit (see FIGS. 3A and 3B) or a cascade climate control circuit (see FIGS. 3C-3F). The transport climate control system 155, including the primary climate control system 155A and the secondary climate control system 155B, is configured to provide climate control within the climate-controlled space 160 to maintain an ultra-low temperature.

The transport climate control system 155 can include a CCU 165 that is mounted to a front wall 170 of the climate-controlled space 160. The CCU 165 can include portions or all of the primary climate control system 155A including, for example, the compressor, the condenser, the evaporator, and the expansion device. In an embodiment, the CCU 165 can be a transport refrigeration unit.

The secondary climate control system 155B is provided within the climate controlled space 160 and can provide backup or additional cooling capacity for cargo being stored in the climate-controlled space 160. The secondary climate control system 155B is a sublimating/evaporative climate control system that can provide backup or additional cooling capacity using an ultra-low temperature phase changing medium releasing or absorbing thermal energy from the climate controlled space. In some embodiments, the ultra-low temperature phase changing medium can be a sublimating/evaporative medium such as, for example, dry ice, liquid nitrogen, etc.

The transport climate control system 155 also includes a programmable climate controller 175 and one or more climate control sensors (not shown) that are configured to measure one or more parameters of the transport climate control system 155 (e.g., an ambient temperature outside of the truck 150, an ambient humidity outside of the truck 150, a compressor suction pressure, a compressor discharge pressure, a supply air temperature of air supplied by the CCU 165 into the climate controlled space 160, a return air temperature of air returned from the climate controlled space 160 back to the CCU 165, a humidity within the climate controlled space 160, etc.) and communicate climate control data to the climate controller 175. The one or more climate control sensors can be positioned at various locations outside the truck 150 and/or inside the truck 150 (including within the climate-controlled space 160).

The climate controller 175 is configured to control operation of the transport climate control system 155 including components of the primary climate control system 155A. The climate controller 175 may include a single integrated control unit 175 or may include a distributed network of climate controller elements 175, 180. The number of distributed control elements in a given network can depend upon the particular application of the principles described herein. The measured parameters obtained by the one or more climate control sensors can be used by the climate controller 175 to control operation of the transport climate control system 155.

The truck 150 includes a sensor 185. In the illustrated embodiment, the sensor 185 is represented as a single sensor. It will be appreciated that in other embodiments, the truck 150 includes a plurality of sensors 185. In some embodiments, the sensor 185 can monitor one or more climate control parameters (e.g., temperature, humidity, atmosphere, etc.) within the climate-controlled space 160 or just outside the truck 150. The sensor 185 can be used by the climate controller 175 to control operation of the transport climate control system 155. The sensor 185 can be in electronic communication with a power source (not shown) of the CCU 165. In an embodiment, the sensor 185 can be in electronic communication with the climate controller 175. It will be appreciated that the electronic communication between the sensor 185 and the climate controller 175 can enable network communication of the sensed climate control parameters measured by the sensor 185. The electronic communication between the climate controller 175 and the sensor 185 can enable the sensed climate control parameters to be utilized in a control of the CCU 165.

FIG. 1C illustrates one embodiment of the climate-controlled transport unit 200 attached to a tractor 205. The climate-controlled transport unit 200 includes a transport climate control system 210 for a transport unit 215. The tractor 205 is attached to and is configured to tow the transport unit 215. The transport unit 215 shown in FIG. 1C is a trailer.

The transport climate control system 200 can include, among other components, a primary climate control system 221A and a secondary climate control system 221B that are in thermal communication with a climate-controlled space 225 of the transport unit 200. The primary climate control system 221A can include a climate control circuit that connects, for example, a compressor, a condenser, an evaporator, and an expander (e.g., an expansion valve or other expansion devices) to provide climate control within the climate controlled space 160. In some embodiments, the climate control circuit can be a single stage climate control circuit (see FIGS. 3A and 3B) or a cascade climate control circuit (see FIGS. 3C-3F). The transport climate control system 200, including the primary climate control system 221A and the secondary climate control system 221B, is configured to provide climate control within the climate-controlled space 225 to maintain an ultra-low temperature.

The secondary climate control system 221B is provided within the climate controlled space 225 and can provide backup or additional cooling capacity for cargo being stored in the climate-controlled space 225. The secondary climate control system 221B is a sublimating/evaporative climate control system that can provide backup or additional cooling capacity using an ultra-low temperature phase changing medium releasing or absorbing thermal energy from the climate controlled space. In some embodiments, the ultra-low temperature phase changing medium can be a sublimating/evaporative medium such as, for example, dry ice, liquid nitrogen, etc.

The transport climate control system 210 includes a CCU 220 that can include portions or all of the primary climate control system 221A. The CCU 220 is disposed on a front wall 230 of the transport unit 215. In other embodiments, it will be appreciated that the CCU 220 can be disposed, for example, on a rooftop or another wall of the transport unit 215. In an embodiment, the CCU 220 can be a transport refrigeration unit.

The transport climate control system 210 also includes a programmable climate controller 235 and one or more sensors (not shown) that are configured to measure one or more parameters of the transport climate control system 210 (e.g., an ambient temperature outside of the transport unit 215, an ambient humidity outside of the transport unit 215, a compressor suction pressure, a compressor discharge pressure, a supply air temperature of air supplied by the CCU 220 into the climate controlled space 225, a return air temperature of air returned from the climate controlled space 225 back to the CCU 220, a humidity within the climate controlled space 225, etc.) and communicate climate control data to the climate controller 235. The one or more climate control sensors can be positioned at various locations outside the transport unit 200 and/or inside the transport unit 200 (including within the climate-controlled space 225).

The climate controller 235 is configured to control operation of the transport climate control system 210 including components of the primary climate control system 221A. The climate controller 235 may include a single integrated control unit 240 or may include a distributed network of climate controller elements 240, 245. The number of distributed control elements in a given network can depend upon the particular application of the principles described herein. The measured parameters obtained by the one or more climate control sensors can be used by the climate controller 235 to control operation of the transport climate control system 210. The climate-controlled transport unit 200 includes a sensor 250. In the illustrated embodiment, the sensor 250 is represented as a single sensor. It will be appreciated that in other embodiments, the climate-controlled transport unit 200 can include a plurality of sensors 250. In some embodiments, the sensor 250 can monitor one or more climate control parameters (e.g., temperature, humidity, atmosphere, etc.) within the climate-controlled space 225 or just outside the transport unit 200. The sensor 250 can be used by the climate controller 235 to control operation of the transport climate control system 210.

The sensor 250 can be in electronic communication with a power source (not shown) of the CCU 220. In an embodiment, the sensor 250 can be in electronic communication with the climate controller 235. It will be appreciated that the electronic communication between the sensor 250 and the climate controller 235 can enable network communication of the sensed climate control parameters measured by the sensor 250. The electronic communication between the climate controller 235 and the sensor 250 can enable the sensed climate control parameters to be utilized in a control of the CCU 220.

FIG. 1D illustrates an embodiment of the climate-controlled transport unit 275. The climate-controlled transport unit 275 includes the multi-zone transport climate control system (MTCS) 280 for a transport unit 285 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The MTCS 280 includes a CCU 290 and a plurality of remote units 295 that provide environmental control (e.g. temperature, humidity, air quality, etc.) within a climate-controlled space 300 of the transport unit 275. The MTCS 280 can include, among other features, a primary climate control system 290A and a secondary climate control system 290B that are in thermal communication with the climate-controlled space 300. The climate-controlled space 300 can be divided into a plurality of zones 305. The term "zone" means a part of an area of the climate-controlled space 300 separated by walls 310. The CCU 290 can operate as a host unit and provide climate control within a first zone 305a of the climate-controlled space 300. The remote unit 295a can provide climate control within a second zone 305b of the climate-controlled space 300. The remote unit 295b can provide climate control within a third zone 305c of the climate-controlled space 300. Accordingly, the MTCS 280 can be used to separately and independently control environmental condition(s) within each of the multiple zones 305 of the climate-controlled space 300.

The primary climate control system 290A can include a climate control circuit that connects, for example, a compressor, a condenser, an evaporator, and an expander (e.g., an expansion valve or other expansion devices) to provide climate control within the climate controlled space 300. In some embodiments, the climate control circuit can be a single stage climate control circuit (see FIGS. 3A and 3B) or a cascade climate control circuit (see FIGS. 3C-3F). The MTCS 280, including the primary climate control system 290A and the secondary climate control system 290B, is configured to provide climate control within the climate-controlled space 300 to maintain an ultra-low temperature.

The CCU 290 is disposed on a front wall 315 of the transport unit 275. In other embodiments, it will be appreciated that the CCU 290 can be disposed, for example, on a rooftop or another wall of the transport unit 275. The CCU 290 can include portions or all of the primary climate control system 290A including, for example, the compressor, the condenser, the evaporator, and the expansion device to provide conditioned air within the climate-controlled space 300. The remote unit 295a is disposed on a ceiling 320 within the second zone 305b and the remote unit 295b is disposed on the ceiling 320 within the third zone 305c. Each of the remote units 295a, b includes an evaporator (not shown) that connects to the rest of the climate control circuit provided in the CCU 290. In an embodiment, the CCU 290 can be a transport refrigeration unit.

The secondary climate control system 290B is provided within the climate controlled space 300 and can provide backup or additional cooling capacity for cargo being stored in the climate-controlled space 300. The secondary climate control system 290B is a sublimating/evaporative climate control system that can provide backup or additional cooling capacity using an ultra-low phase temperature changing medium releasing or absorbing thermal energy from the climate controlled space. In some embodiments, the ultra-low temperature phase changing medium can be a sublimating/evaporative medium such as, for example, dry ice, liquid nitrogen, etc.

The MTCS 280 also includes a programmable climate controller 325 and one or more climate control sensors (not shown) that are configured to measure one or more parameters of the MTCS 280 (e.g., an ambient temperature outside of the transport unit 275, an ambient humidity outside of the transport unit 275, a compressor suction pressure, a compressor discharge pressure, supply air temperatures of air supplied by the CCU 290 and the remote units 295 into each of the zones 305, return air temperatures of air returned from each of the zones 305 back to the respective CCU 290 or remote unit 295a or 295b, a humidity within each of the zones 305, etc.) and communicate climate control data to a climate controller 325. The one or more climate control sensors can be positioned at various locations outside the transport unit 275 and/or inside the transport unit 275 (including within the climate-controlled space 300).

The climate controller 325 is configured to control operation of the MTCS 280 including components of the climate control circuit. The climate controller 325 may include a single integrated control unit 330 or may include a distributed network of climate controller elements 330, 335. The number of distributed control elements in a given network can depend upon the particular application of the principles described herein. The measured parameters obtained by the one or more climate control sensors can be used by the climate controller 325 to control operation of the MTCS 280.

The climate-controlled transport unit 275 includes a sensor 340. In the illustrated embodiment, the sensor 340 is represented as a single sensor. It will be appreciated that in other embodiments, the climate-controlled transport unit 275 can include a plurality of sensors 340. In some embodiments, the sensor 340 can monitor one or more climate control parameters (e.g., temperature, humidity, atmosphere, etc.) within the climate-controlled space 300. The sensor 340 can be used by the climate controller 325 to control operation of the MTCS 280.

The sensor 340 can be in electronic communication with a power source (not shown) of the CCU 290. In an embodiment, the sensor 340 can be in electronic communication with the climate controller 325. It will be appreciated that the electronic communication between the sensor 340 and the climate controller 325 can enable network communication of the sensed climate control parameters measured by the sensor 340. The electronic communication between the climate controller 325 and the sensor 340 can enable the sensed climate control parameters to be utilized in a control of the CCU 290.

FIG. 1E depicts the intermodal container 350 having the transport climate control system 355 for providing climate control within a climate-controlled space 358. The transport climate control system 355 includes a climate control unit (CCU) 360 that is mounted to a side 352 at one end of the container 350. In an embodiment, the CCU 360 can be a transport refrigeration unit.

The transport climate control system 355 can include, among other components, a primary climate control system 365A and a secondary climate control system 365B that are in thermal communication with the climate-controlled space 358. The primary climate control system 365A can include a climate control circuit that connects, for example, a compressor, a condenser, an evaporator, and an expander (e.g., an expansion valve or other expansion devices) to provide climate control within the climate controlled space 308. In some embodiments, the climate control circuit can be a single stage climate control circuit (see FIGS. 3A and 3B) or a cascade climate control circuit (see FIGS. 3C-3F). The transport climate control system 355, including the primary climate control system 3655A and the secondary climate control system 365B, is configured to provide climate control within the climate-controlled space 308 to maintain an ultra-low temperature.

The CCU 360 can include portions or all of the primary climate control system 365A including, for example, the compressor, the condenser, the evaporator, and the expansion device.

The secondary climate control system 365B is provided within the climate controlled space 358 and can provide backup or additional cooling capacity for cargo being stored in the climate-controlled space 358. The secondary climate control system 365B is a sublimating/evaporative climate control system that can provide backup or additional cooling capacity using an ultra-low temperature phase changing medium releasing or absorbing thermal energy from the climate controlled space. In some embodiments, the ultra-low temperature phase changing medium can be a sublimating/evaporative medium such as, for example, dry ice, liquid nitrogen, etc.

The transport climate control system 355 also includes a programmable climate controller 370 and one or more climate control sensors (not shown) that are configured to measure one or more parameters of the transport climate control system 355 (e.g., an ambient temperature outside of the container 350, an ambient humidity outside of the container 350, a compressor suction pressure, a compressor discharge pressure, a supply air temperature of air supplied by the CCU 360 into the climate controlled space 358, a return air temperature of air returned from the climate controlled space 358 back to the CCU 360, a humidity within the climate controlled space 358, etc.) and communicate the measured parameters to the climate controller 370. The one or more climate control sensors can be positioned at various locations outside the container 350 and/or inside the container 350 (including within the climate-controlled space 358).

The climate controller 370 is configured to control operation of the transport climate control system 355 including one or more components of the primary climate control system 365A. The climate controller 370 may include a single integrated control unit 372 or may include a distributed network of climate controller elements 372, 374. The number of distributed control elements in a given network can depend upon the particular application of the principles of this disclosure. The measured parameters obtained by the one or more climate control sensors can be used by the climate controller 370 to control operation of the transport climate control system 355.

The container 350 includes a sensor 375. In the illustrated embodiment, the sensor 375 is represented as a single sensor. It will be appreciated that in other embodiments, the container 350 can include a plurality of sensors 375. In some embodiments, the sensor 375 can monitor one or more climate control parameters (e.g., temperature, humidity, atmosphere, etc.) within the climate-controlled space 358 or just outside the container 350. The sensor 375 can be used by the climate controller 370 to control operation of the transport climate control system 355. The sensor 375 can be in electronic communication with a power source (not shown) of the CCU 360. In an embodiment, the sensor 375 can be in electronic communication with the climate controller 370. It will be appreciated that the electronic communication between the sensor 375 and the climate controller 370 can enable network communication of the sensed climate control parameters measured by the sensor 375. The electronic communication between the climate controller 370 and the sensor 375 can enable the sensed climate control parameters to be utilized in a control of the CCU 360.

Figure 2:
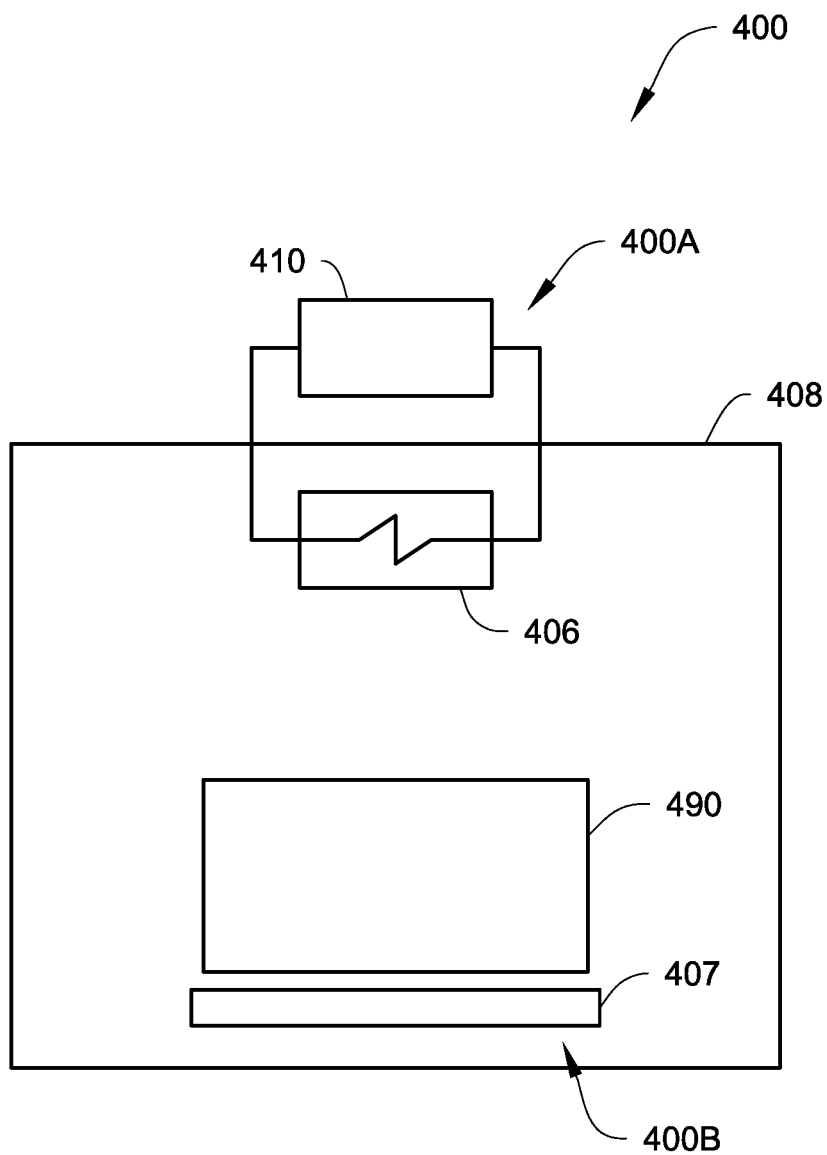
FIG. 2 is a schematic diagram of a transport climate control system that includes a primary climate control system in thermal communication with a secondary climate control system, according to an embodiment.

FIG. 2 is a schematic diagram of a primary climate control system 400A in thermal communication with a secondary climate control system 400B of a transport climate control system 400, according to an embodiment. As shown in FIG. 2, the primary climate control system 400A and the secondary climate control system 400B are in thermal communication with a climate controlled space 408 containing a cargo 490.

The primary climate control system 400A provides all or a portion of cooling capacity for cooling the climate controlled space 408 to an ultra-low temperature. The primary climate control system 400A is a vapor-compression type climate control system 410 in thermal communication with the climate controlled space 408 through a main evaporator 406.

The vapor-compression type climate control system 410 can provide cooling capacity of the primary climate control system 400A. The vapor-compression type climate control system 410 can include, for example, a single stage climate control circuit, a cascade climate control circuit, etc. The vapor-compression type climate control system 410 is configured to fluidly connect, for example, a compressor, a condenser, an evaporator, and an expander (e.g., an expansion valve or other expansion devices) to allow a working fluid to circulate there through and provide climate control for the climate controlled space 408. The climate control circuit can further include other climate control circuit components such as, for example, a suction-liquid heat exchanger, one or more economizers, a sub-cooling heat exchanger, a de-superheating heat exchanger, one or more liquid receivers and one or more buffer systems, etc. for improving operating efficiency of the climate control circuit. The vapor-compression type climate control system 410 can further include one or more heat transfer circuit components including, for example, one or more condenser fans, one or more evaporator blowers, etc.

The main evaporator 406 thermally connects the vapor-compression type climate control system 410 to the climate controlled space 408 and provides cooling capacity by transmitting thermal energy between the climate controlled space 408 and a working fluid passing through the main evaporator 406.

The working fluid can be unsaturated hydrofluorocarbons (HFC), hydrofluoroolefins (HFO), hydrocarbons (HC), carbon dioxide (R744), or a combination thereof. In embodiments where the primary climate control system 400A is a single stage vapor-compression type climate control system, the working fluid can be, for example, R404A, R452A, R454A, R454C, etc. In embodiments where the primary climate control system 400A is a cascade vapor-compression type climate control system having a first heat transfer circuit and a second heat transfer circuit that includes the main evaporator 406, the working fluid can be, for example, R134a, R513A, R1234yf, R1234ze, R515B, etc. for the first heat transfer circuit (e.g., first heat transfer circuits 700A1, 800A1, 900A1 and 1000A1 shown in FIGS. 3C-3F) and R23, R508B, LFR5A, etc. for the second heat transfer circuit (e.g., second heat transfer circuits 700A2, 800A2, 900A2 and 1000A2 shown in FIGS. 3C-3F). It will be appreciated that LPR5A can be a mixture of R23, R1132a, R125, and R744.

The secondary climate control system 400B is a sublimating/evaporative climate control system that can provide backup or additional cooling capacity for the climate controlled space 408. The secondary climate control system 400B includes an ultra-low temperature phase-changing medium 407 configured to release or absorb thermal energy from the climate controlled space 408.

The ultra-low temperature phase changing medium 407 is configured to absorb thermal energy from a surrounding environment when it changes from one phase to another. In some embodiments, the ultra-low temperature phase changing medium 407 can be a sublimating/evaporative medium such as, for example, dry ice, liquid nitrogen, etc. An advantage of using a sublimating phase changing medium is that it is inert and can be handled in its solid phase without expensive containers. Further, when the sublimating phase changing medium undergoes a phase change, the phase change is from a solid to a gas. Thus, when the sublimating phase changing medium is in a gaseous phase (such as, for example, carbon dioxide), the sublimating phase changing medium is unlikely to cause liquid related damage to the climate controlled space, the enclosure, the cargo, etc.

Figure 3A:
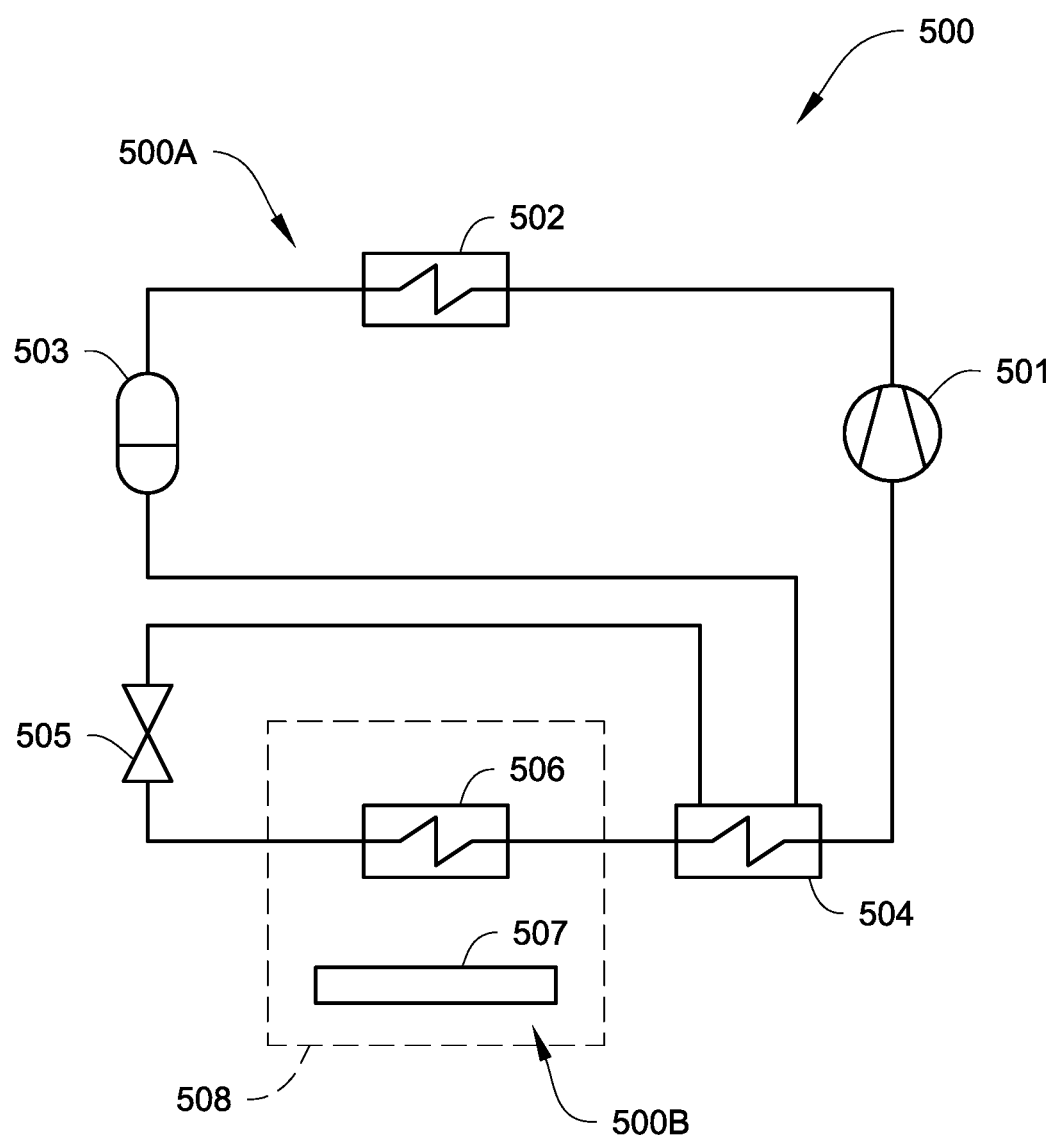
FIG. 3A is a schematic diagram of a transport climate control system that includes a primary climate control system, that includes a single stage climate control circuit with a suction-liquid heat exchanger, in thermal communication with a secondary climate control system, according to an embodiment.

FIG. 3A is a schematic diagram of a transport climate control system 500 that includes a primary climate control system 500A and a secondary climate control system 500B, according to one embodiment. The primary climate control system 500A and the secondary climate control system 500B are in thermal communication with a climate controlled space 508 configured to contain a cargo (not shown).

The primary climate control system 500A provides all or a portion of cooling capacity for the climate controlled space 508. The primary climate control system 500A can be a vapor-compression type climate control system in thermal communication with the climate controlled space 508 through a main evaporator 506.

The vapor-compression type climate control system provides cooling capacity of the primary climate control system 500A. The vapor-compression type climate control system includes a single stage climate control circuit that fluidly connects a compressor 501, a condenser 502, an expander 505 (e.g., an expansion valve or other expansion devices) and a main evaporator 506 to allow a working fluid to circulate there through in order to provide climate control for the climate controlled space 508.

The single stage climate control circuit fluidly connects a compressor 501, a condenser 502, an expander 505 (e.g., an expansion valve or other expansion devices) and a main evaporator 506 to allow a heat transfer fluid to circulate there through. The heat transfer fluid can generally be a working fluid (e.g., a refrigerant) having a relatively low global warming potential (GWP). Examples of suitable heat transfer fluids can include, but are not limited to, R404A, R452A, R454A, or R454C. The vapor-compression type climate control system can further include one or more other climate control circuit components and one or more heat transfer circuit components. For example, the vapor-compression type climate control system of the primary climate control system 500A further includes a suction-liquid refrigerant heat exchanger 504 and a liquid receiver 503.

The suction-liquid heat exchanger 504 is configured to remove thermal energy from a working fluid upstream of the expander 505. The thermal energy is removed after the working fluid passes through the main evaporator 506.

The liquid receiver 503 can help manage cooling capacity demand fluctuations at the main evaporator 506 by accumulating working fluid within the liquid receiver 503 when cooling capacity demand is low and releasing the accumulated working fluid within the liquid receiver 503 when cooling capacity demand is high. The liquid receiver 503 is positioned on a flow path between the condenser 502 and the expander 505. In an embodiment with the suction-liquid heat exchanger 504, the liquid receiver 503 is positioned on a flow path between the condenser 502 and the suction-liquid heat exchanger 504.

The secondary climate control system 500B can provide backup or additional cooling capacity for the climate controlled space 508 through an ultra-low temperature phase changing medium 507 releasing or absorbing thermal energy from the climate controlled space 408.

The ultra-low temperature phase changing medium 507 can be configured to absorb thermal energy from a surrounding environment when it changes from one phase to another. In some embodiments, the ultra-low temperature phase changing medium 507 can be a sublimating/evaporative medium such as, for example, dry ice, liquid nitrogen, etc.

Figure 3B:
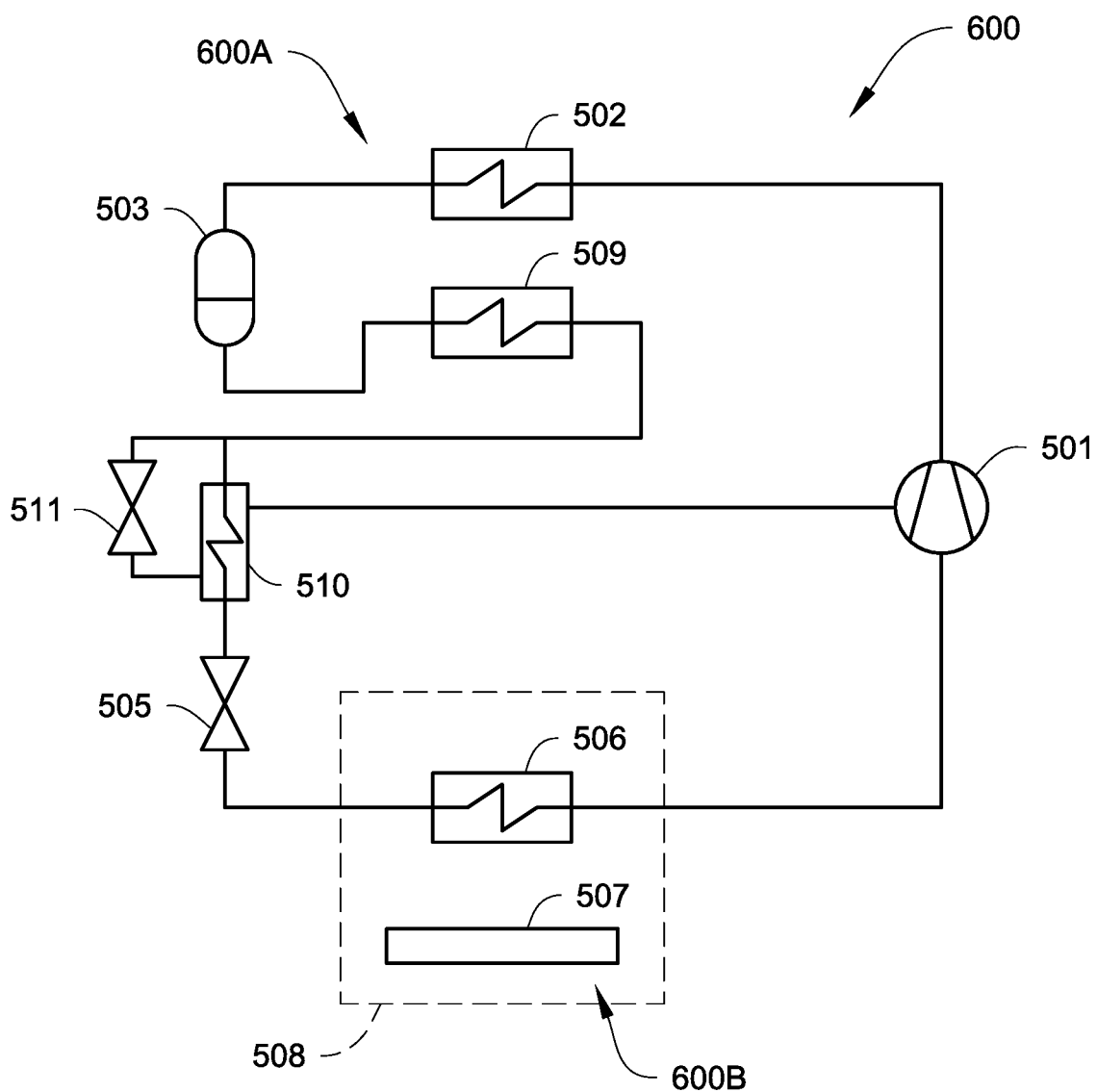
FIG. 3B is a schematic diagram of a transport climate control system that includes a primary climate control system, that includes a single stage climate control circuit with an economizer, in thermal communication with a secondary climate control system, according to an embodiment.

FIG. 3B is a schematic diagram of a transport climate control system 600 that includes a primary climate control system 600A and a secondary climate control system 600B, according to an embodiment. The primary climate control system 600A and the secondary climate control system 600B that are in thermal communication with the climate controlled space 508 configured to contain a cargo (not shown).

The primary climate control system 600A provides all or a portion of cooling capacity for the climate controlled space 508. The primary climate control system 600A can be a vapor-compression type climate control system in thermal communication with the climate controlled space 508 through a main evaporator 506.

The vapor-compression type climate control system provides cooling capacity of the primary climate control system 600A. The vapor-compression type climate control system includes a single stage climate control circuit that fluidly connects a compressor 501, a condenser 502, an expander 505 (e.g., an expansion valve or other expansion devices) and a main evaporator 506 to allow a working fluid to circulate there through in order to provide climate control for the climate controlled space 508.

The single stage climate control circuit fluidly connects a compressor 501, a condenser 502, an expander 505 (e.g., an expansion valve or other expansion devices) and a main evaporator 506 to allow a heat transfer fluid to circulate there through. The heat transfer fluid can generally be a working fluid (e.g., a refrigerant) having a relatively GWP. Examples of suitable heat transfer fluids can include, but are not limited to, R404A, R452A, R454A, or R454C.

The vapor-compression type climate control system can further include one or more climate control circuit components. For example, the vapor-compression type climate control system of the primary climate control system 600A further includes an economizer 510 and a sub-cooling heat exchanger 509. The economizer 510 and the economizer expander 511 are in fluid communication with the compressor 501. The economizer 510 is configured to remove thermal energy from a working fluid upstream of the expander 505. The thermal energy is removed using a diverged portion of the working fluid upstream of the expander 505 to remove thermal energy of a remaining portion of the working fluid upstream of the expander 505. The remaining portion of the working fluid is then directed into the expander 505. The diverged portion of the working fluid, after undergoing a heat exchange at the economizer 510, is directed into the compressor 501.

The vapor-compression type climate control system of the primary climate control system 600A further includes a sub-cooling heat exchanger 509 in fluid communication with the compressor 501. The sub-cooling heat exchanger 509 is positioned downstream of the condenser 502, relative to the working fluid passing through the first compressor 501. A process fluid side of the sub-cooling heat exchange 509 is in fluid connection with a working fluid side of the condenser 502. According to one embodiment, the condenser is air cooled. A working fluid (e.g., cooling air) can cool the heat transfer fluid (i.e., the working fluid passing through the first compressor 501) within the sub-cooling heat exchange 509 and the condenser 502. The sub-cooling heat exchanger 509 and the condenser 502 can exchange thermal energy with the cooling air sequentially. In one embodiment, the cooling air can exchange thermal energy sequentially by flowing though the sub-cooling heat exchange 509 before flowing through the condenser 502. The cooling air can absorb thermal energy and raise its temperature after flowing through the sub-cooling heat exchange 509 and the condenser 502. Generally, the temperature of the condenser 502 can be higher than the temperature of the sub-cooling heat exchanger 509. The cooling air temperature can be lower than the temperature of the sub-cooling heat exchanger 509. The cooling air temperature, after passing the sub-cooling heat exchanger 509, can be lower than the temperature of the condenser 502. In another embodiment, the sub-cooling heat exchanger 509 can be positioned upstream of the condenser 502, and the sub-cooling heat exchanger 509 can be positioned downstream of the condenser 502 when operating in a cooling mode. The working fluid can be a refrigerant.

The liquid receiver 503 can help manage fluctuation in a demand of cooling capacity at the main evaporator 506 by temporarily storing working fluid within. The liquid receiver 503 is positioned on a flow path between the condenser 502 and the expander 505. As shown in FIG. 3B, the liquid receiver 503 is positioned on a flow path between the condenser 502 and the economizer 510. Also, the liquid receiver 503 is positioned on a flow path between the condenser 502 and the sub-cooling heat exchanger 509.

The secondary climate control system 600B can provide backup or additional cooling capacity for the climate controlled space 508 using an ultra-low temperature phase changing medium 507 that is configured to release or absorb thermal energy from the climate controlled space 508.

The ultra-low temperature phase changing medium 507 can be configured to absorb thermal energy from a surrounding environment when it changes from one phase to another. In some embodiments, the ultra-low temperature phase changing medium 507 can be a sublimating/evaporative medium such as, for example, dry ice, liquid nitrogen, etc.

Figure 3C:
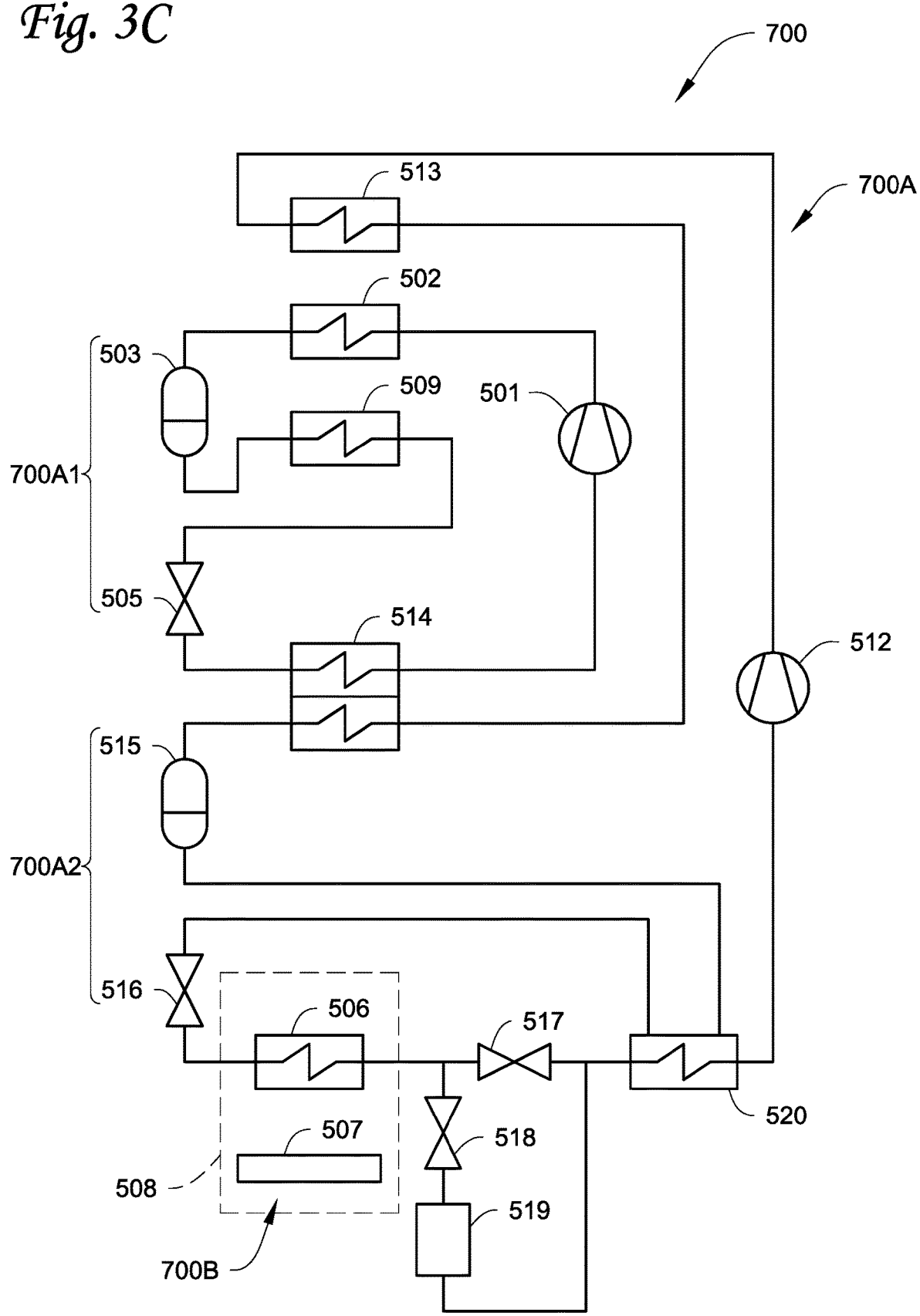
FIG. 3C is a schematic diagram of a transport climate control system that includes a primary climate control system, that includes a cascade climate control circuit, in thermal communication with a secondary climate control system, according to an embodiment.

FIG. 3C is a schematic diagram of a transport climate control system 700 that includes a primary climate control system 700A and a secondary climate control system 700B. The primary climate control system 700A and the secondary climate control system 700B are in thermal communication with the climate controlled space 508 configured to contain a cargo (not shown).

The primary climate control system 700A includes a cascade climate control circuit that includes a first heat transfer circuit 700A1 and a second transfer circuit 700A2. In an embodiment, the first heat transfer circuit 700A1 can alternatively be referred to as the primary heat transfer circuit 700A1, the high side heat transfer circuit 700A1, the condensing side heat transfer circuit 700A1, the stage two heat transfer circuit 700A1, or the like. In an embodiment, the second heat transfer circuit 700A2 can alternatively be referred to as the low side heat transfer circuit 700A2, the evaporating side heat transfer circuit 700A2, or the like. The first heat transfer circuit 700A1 is in thermal communication with the second heat transfer circuit 700A2.

The first heat transfer circuit 700A1 includes a first climate control circuit that fluidly connects a first compressor 501, a first condenser 502, an expander 505, and a cascade heat exchanger 514 to allow a first heat transfer fluid to circulate there through. The first heat transfer fluid can generally be a working fluid (e.g., a refrigerant) having a relatively low GWP. Examples of suitable first heat transfer fluids for the first heat transfer circuit 700A1 can include, but are not limited to, R134a, R513A, R1234yf, R1234ze, or R515B.

The second heat transfer circuit 700A2 includes a secondary climate control circuit that fluidly connects a second compressor 512, the cascade heat exchanger 514, a second expander 515, and a main evaporator 506 to allow a second heat transfer fluid to circulate there through. The second heat transfer fluid in the second heat transfer circuit 700A2 can generally be different from the heat transfer fluid in the first heat transfer circuit 700A1. The second heat transfer fluid can generally be a working fluid (e.g., a refrigerant) having a relatively low GWP. The second heat transfer fluid in the second heat transfer circuit 700A2 can be, for example, R23, R508B, or LFR5A. The second heat transfer fluid in the second heat transfer circuit 700A2 can be selected, for example, based on its performance at relatively ultra-low temperatures.

The primary climate control system 700A is configured to maintain a desired climate condition in the air conditioned space 508 by providing all or partial cooling capacity. More particularly, the first heat transfer circuit 700A1 may receive thermal energy that is rejected from the second heat transfer circuit 700A2 via the cascade heat exchanger 514. The second heat transfer circuit 700A2 can in turn be used to maintain the desired climate condition within the interior space 508.

The first heat transfer circuit 700A1 can function according to generally known principles in order to remove heat from the second heat transfer circuit 700A2. The first compressor 501 can be configured to compress the first heat transfer fluid from a relatively lower pressure gas to a relatively higher-pressure gas. The relatively higher-pressure gas can be discharged from the first compressor 501 and be directed to flow through the first condenser 502. In accordance with generally known principles, the first heat transfer fluid can flow through the condenser 502 and reject heat to a heat transfer fluid or medium (e.g., air, etc.), thereby cooling the heat transfer fluid or medium.

According to an embodiment, the cooled first heat transfer fluid which can now be in a liquid form can be configured to flow through a sub-cooling heat exchanger 509 where the heat transfer fluid is further cooled prior to entering the first expander 505.

At the cascade heat exchanger 514, the first heat transfer fluid circulating through the first heat transfer circuit 700A1 can absorb heat from the second heat transfer fluid circulating through the second heat transfer circuit 700A2, thereby heating the first heat transfer fluid and converting it to, at least partially, a gaseous form. The gaseous first heat transfer fluid can then return to the first compressor 501. The above-described process can continue while the first heat transfer circuit 700A1 is operating. In an embodiment, the cascade heat exchanger 514 and the heat exchange relationship between the first heat transfer circuit 700A1 and the second heat transfer circuit 700A2 can increase an efficiency of the primary climate control system 700A by, for example, reducing an amount of energy input needed to maintain the one or more desired climate conditions inside the climate controlled space 508. In an embodiment, the reduction in energy input can, for example, reduce an impact on the environment. In an embodiment, the cascade heat exchanger 514 can reduce use of high pressure climate control components (e.g., by enabling use of lower pressure heat transfer fluids).

The second heat transfer circuit 700A2 can function according to generally known principles in order to reject heat to the first heat transfer circuit 700A1. The second compressor 512 can be configured to compress the second heat transfer fluid from a relatively lower pressure gas to a relatively higher-pressure gas. The relatively higher-pressure gas can be discharged from the second compressor 512 and be directed to flow through the cascade heat exchanger 514. In accordance with generally known principles, the second heat transfer fluid can be in a heat exchange relationship with the first condenser 502 of the heat transfer fluid of the first heat transfer circuit 700A1 and can reject heat to the first heat transfer fluid of the first heat transfer circuit 700A1, thereby cooling the second heat transfer fluid of the second heat transfer circuit 700A2. The cooled second heat transfer working fluid which can now be in a liquid form can flow to the second expander 516. As a result, at least a portion of the second heat transfer fluid can be converted to a gaseous form. The second heat transfer fluid, which can now be in a mixed liquid and gaseous form, can flow to the main evaporator 506. At the main evaporator 506, the second heat transfer fluid in the second heat transfer circuit 700A2 can absorb heat from a heat transfer medium (e.g., air), heating the second heat transfer fluid and converting it to a gaseous form.

As shown in FIG. 3C, the second heat transfer circuit 700A2 also includes a suction-liquid heat exchanger 520. The suction-liquid heat exchanger 520 is configured to remove thermal energy from a working fluid upstream of the second expander 516. The thermal energy is removed using the working fluid exiting the main evaporator 506.

According to an embodiment, the second heat transfer circuit 700A2 can include a de-superheating heat exchanger 513. The de-superheating heat exchanger 513 can be configured to remove thermal energy from the second heat transfer fluid downstream of the second compressor 512.

The de-superheating heat exchanger 513 is positioned along a flow path between the second compressor 512 and the cascade heat exchanger 514. According to one embodiment, a working fluid (e.g., cooling air) can cool the heat transfer fluid (i.e., the working fluid passing through the first or second compressor 501, 512) within the condenser 502 and the de-superheating heat exchanger 513. The condenser 502 and the de-superheating heat exchanger 513 the can exchange thermal energy with the cooling air sequentially. In one embodiment, the cooling air can exchange thermal energy sequentially by flowing though the condenser 502 before flowing through the de-superheating heat exchanger 513. The cooling air can absorb thermal energy and raise its temperature after flowing pass the condenser 502 and the de-superheating heat exchanger 513. Generally, the temperature of the de-superheating heat exchanger 513 can be higher than the temperature of the condenser 502. The cooling air temperature, before passing through the condenser 502, can be lower than the temperature of the condenser 502. The cooling air temperature, after passing the condenser 502, can be lower than the temperature of de-superheating heat exchanger 513.

In one embodiment, the primary climate control system 700A can include one or more heat transfer circuit components, for example, one or more liquid receivers and/or buffer system. For example, the first heat transfer circuit 700A1 includes a first liquid receiver 503 configured to help manage cooling capacity demand fluctuations at the cascade heat exchanger 514. The first liquid receiver 503 can manage cooling capacity demand fluctuations by accumulating the first heat transfer fluid within the first liquid receiver 503 when the cooling capacity demand is low and releasing the accumulated first heat transfer fluid when the cooling capacity demand is high. The first liquid receiver 503 is positioned on a flow path between the first condenser 502 and the first expander 505. In an embodiment with a sub-cooling heat exchanger 509, the first liquid receiver 503 is positioned on a flow path between the first condenser 502 and the sub-cooling heat exchanger 509.

As shown in FIG. 3C, the second heat transfer circuit 700A2 includes a second liquid receiver 515 configured to help manage cooling capacity demand fluctuations at the main evaporator 506. The second liquid receiver 515 can manage cooling capacity demand fluctuations by accumulating the second heat transfer fluid within the second liquid receiver 515 when the cooling capacity demand is low and releasing the accumulated second heat transfer fluid when the cooling capacity demand is high. The second liquid receiver 515 is positioned on a flow path between the second compressor 512 and the second expander 516. In another embodiment, the second liquid receiver 515 can be positioned on a flow path between the cascade heat exchanger 514 and the suction-liquid heat exchanger 520.

In one embodiment, the second heat transfer circuit 700A2 can also include a buffer system that can help manage cooling capacity demand fluctuations at the main evaporator 506. The buffer system, as shown in FIG. 3C, includes a buffer system tank 519 controlled by a first and second buffer control valves 517 and 518. In another embodiment, the buffer system tank 519 can include more than one buffer system tanks. The buffer system tank 519 is positioned on a flow path between the main evaporator 506 and the suction-liquid heat exchanger 520. It will be appreciated that the buffer system, as described herein, can stabilize pressure and temperature in a cascade climate control circuit during startup. For example, during a startup phase (e.g., during initial pull down/cool down of the climate control system), the second heat transfer fluid passing through the main evaporator 506 can be diverted to the buffer system by opening a first buffer system valve 518 and closing a second buffer system valve 517 so as to accumulate a portion of the second heat transfer fluid within the buffer system tank 519. After the startup phase, the first buffer system valve 518 can be closed and the second buffer system value 517 can be opened to allow the second heat transfer fluid passing through the main evaporator 506 to bypass the buffer system.

The secondary climate control system 700B can provide backup or additional cooling capacity for the climate controlled space 508 through an ultra-low temperature phase changing medium 407 releasing or absorbing thermal energy from the climate controlled space 508.

The ultra-low temperature phase changing medium 507 can be configured to absorb thermal energy from a surrounding environment when it changes from one phase to another. In some embodiments, the ultra-low temperature phase changing medium 507 can be a sublimating/evaporative medium such as, for example, dry ice, liquid nitrogen, etc.

Figure 3D:
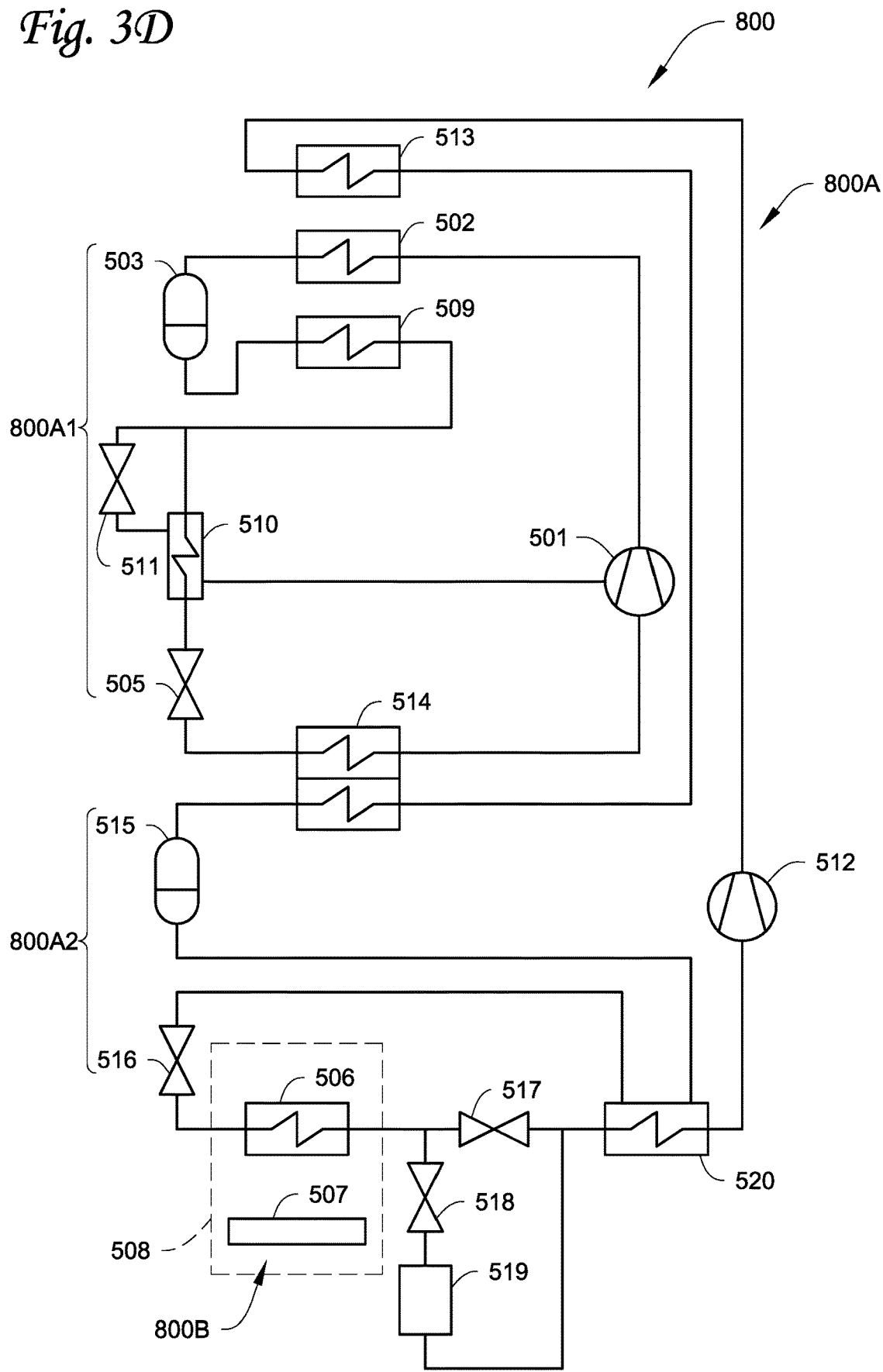
FIG. 3D is a schematic diagram of a transport climate control system that includes a primary climate control system, that includes a cascade climate control circuit with an economizer, in thermal communication with a secondary climate control system, according to an embodiment.

FIG. 3D is a schematic diagram of a transport climate control system 800 that includes a primary climate control system 800A and a secondary climate control system 800B, according to one embodiment. The primary climate control system 800A and the secondary climate control system 800B are in thermal communication with the climate controlled space 508 configured to contain a cargo (not shown).

The primary climate control system 800A includes a first heat transfer circuit 800A1 and a second transfer circuit 800A2. In an embodiment, the first heat transfer circuit 800A1 can alternatively be referred to as the primary heat transfer circuit 800A1, the high side heat transfer circuit 800A1, the condensing side heat transfer circuit 800A1, the stage two heat transfer circuit 800A1, or the like. In an embodiment, the second heat transfer circuit 800A2 can alternatively be referred to as the low side heat transfer circuit 800A2, the evaporating side heat transfer circuit 800A2, or the like. The first heat transfer circuit 800A1 is in thermal communication with the second heat transfer circuit 800A2.

The first heat transfer circuit 800A1 can be similar to, for example, the first heat transfer circuit 700A1 as shown in FIG. 3C and described above with an economizer 510 added to the first heat transfer circuit 700A1. As shown in FIG. 3D, the first heat transfer circuit 800A1 includes an economizer 510 and an economizer expander 511 in fluid communication with the compressor 501. The economizer 510 is configured to remove thermal energy from the first heat transfer fluid upstream of the expander 505. The thermal energy is removed using a diverged portion of the first heat transfer fluid upstream of the expander 505 to remove thermal energy of a remaining portion of the first heat transfer fluid upstream of the expander 505. The remaining portion of the first heat transfer fluid is then directed into the expander 505. The diverged portion of the first heat transfer fluid, after heat exchanging at the economizer 510, is directed into the compressor 501.

The second heat transfer circuit 800A2 can be similar to, for example, the second heat transfer circuit 700A2 as shown in FIG. 3C and described above.

According to an embodiment, the working fluid can be R134a, R513A, R1234yf, R1234ze, or R515B for the first heat transfer circuit 800A1 and R23, R508B, or LFR5A for the second heat transfer circuit 800A2.

The secondary climate control system 800B can provide backup or additional cooling capacity for the climate controlled space 508 through an ultra-low temperature phase changing medium 507 releasing or absorbing thermal energy from the climate controlled space 508.

The ultra-low temperature phase changing medium 507 can be configured to absorb thermal energy from a surrounding environment when it changes from one phase to another. In some embodiments, the ultra-low temperature phase changing medium 507 can be a sublimating/evaporative medium such as, for example, dry ice, liquid nitrogen, etc.

Figure 3E:
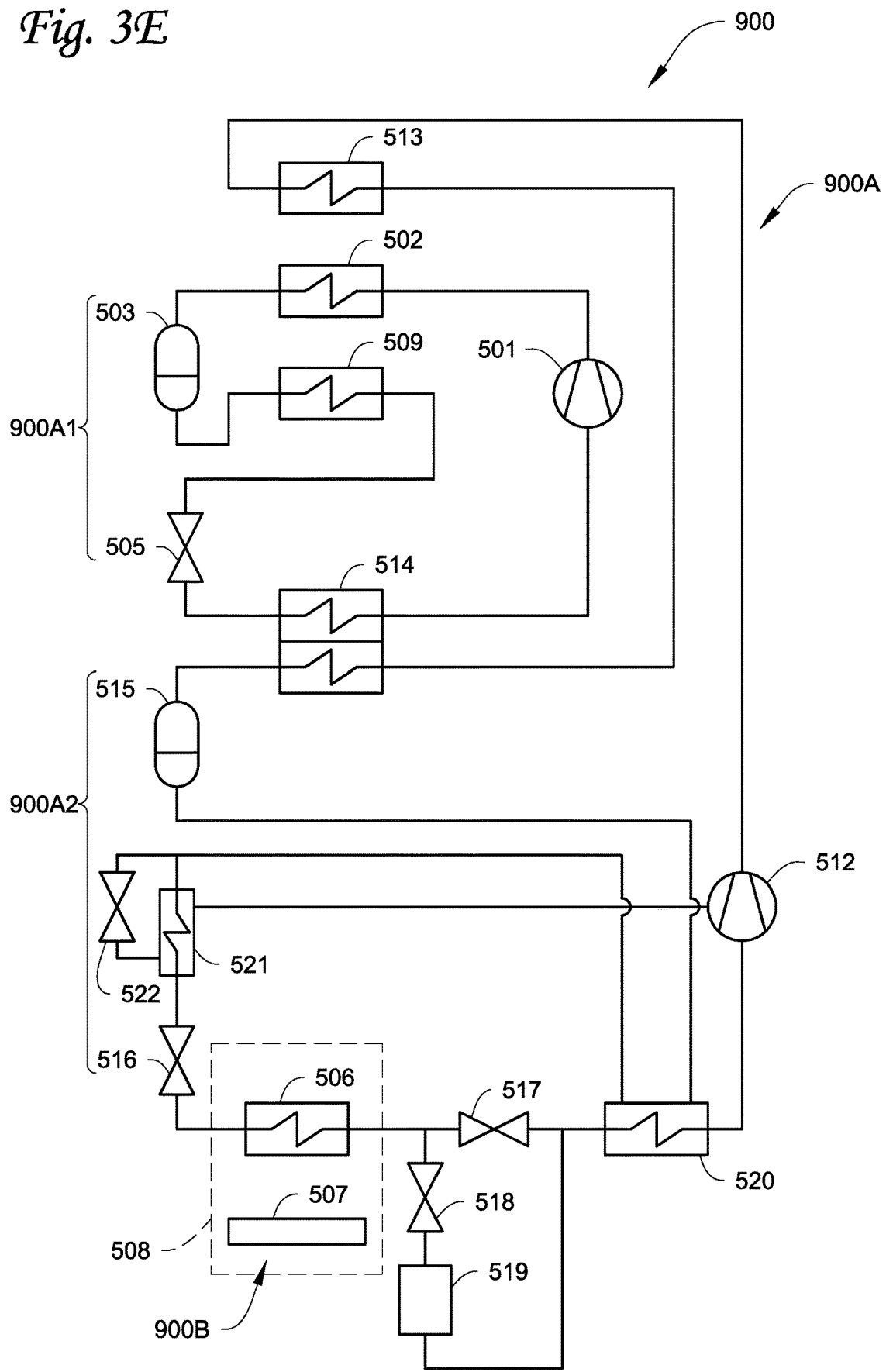
FIG. 3E is a schematic diagram of a transport climate control system that includes a primary climate control system, that includes a cascade climate control circuit with an economizer, in thermal communication with a secondary climate control system, according to another embodiment.

FIG. 3E is a schematic diagram of a transport climate control system 900 that includes a primary climate control system 900A and a secondary climate control system 900B. The primary climate control system 900A and the secondary climate control system 900B are in thermal communication with the climate controlled space 508 configured to contain a cargo (not shown).

The primary climate control system 900A includes a first heat transfer circuit 900A1 and a second transfer circuit 900A2. In an embodiment, the first heat transfer circuit 900A1 can alternatively be referred to as the primary heat transfer circuit 900A1, the high side heat transfer circuit 900A1, the condensing side heat transfer circuit 900A1, the stage two heat transfer circuit 900A1, or the like. In an embodiment, the second heat transfer circuit 900A2 can alternatively be referred to as the low side heat transfer circuit 900A2, the evaporating side heat transfer circuit 900A2, or the like. The first heat transfer circuit 900A1 is in thermal communication with the second heat transfer circuit 900A2.

The first heat transfer circuit 900A1 can be similar to, for example, the first heat transfer circuit 700A1 as shown in FIG. 3C and described above.

The second heat transfer circuit 900A2 can be similar to, for example, the second heat transfer circuit 700A2 as shown in FIG. 3C and described above with an economizer 521 added to the second heat transfer circuit 700A2. As shown in FIG. 3E, the second heat transfer circuit 900A2 includes an economizer 510 and an economizer expander 521 in fluid communication with the second compressor 512. The economizer 521 is configured to remove thermal energy from the second heat transfer fluid upstream of the second expander 516. The thermal energy is removed using a diverged portion of the second heat transfer fluid upstream of the second expander 516 to remove thermal energy of a remaining portion of the second heat transfer fluid upstream of the second expander 516. The remaining portion of the second heat transfer fluid is then directed into the second expander 516. The diverged portion of the second heat transfer fluid, after heat exchanging at the economizer 521, is directed into the second compressor 512.

According to an embodiment, the working fluid can be R134a, R513A, R1234yf, R1234ze, or R515B for the first heat transfer circuit 900A1 and R23, R508B, or LFR5A for the second heat transfer circuit 900A2.

The secondary climate control system 900B can provide backup or additional cooling capacity for the climate controlled space 508 through an ultra-low temperature phase changing medium 507 releasing or absorbing thermal energy from the climate controlled space 508.

The ultra-low temperature phase changing medium 507 can be configured to absorb thermal energy from a surrounding environment when it changes from one phase to another. In some embodiments, the ultra-low temperature phase changing medium 507 can be a sublimating/evaporative medium such as, for example, dry ice, liquid nitrogen, etc.

Figure 3F:
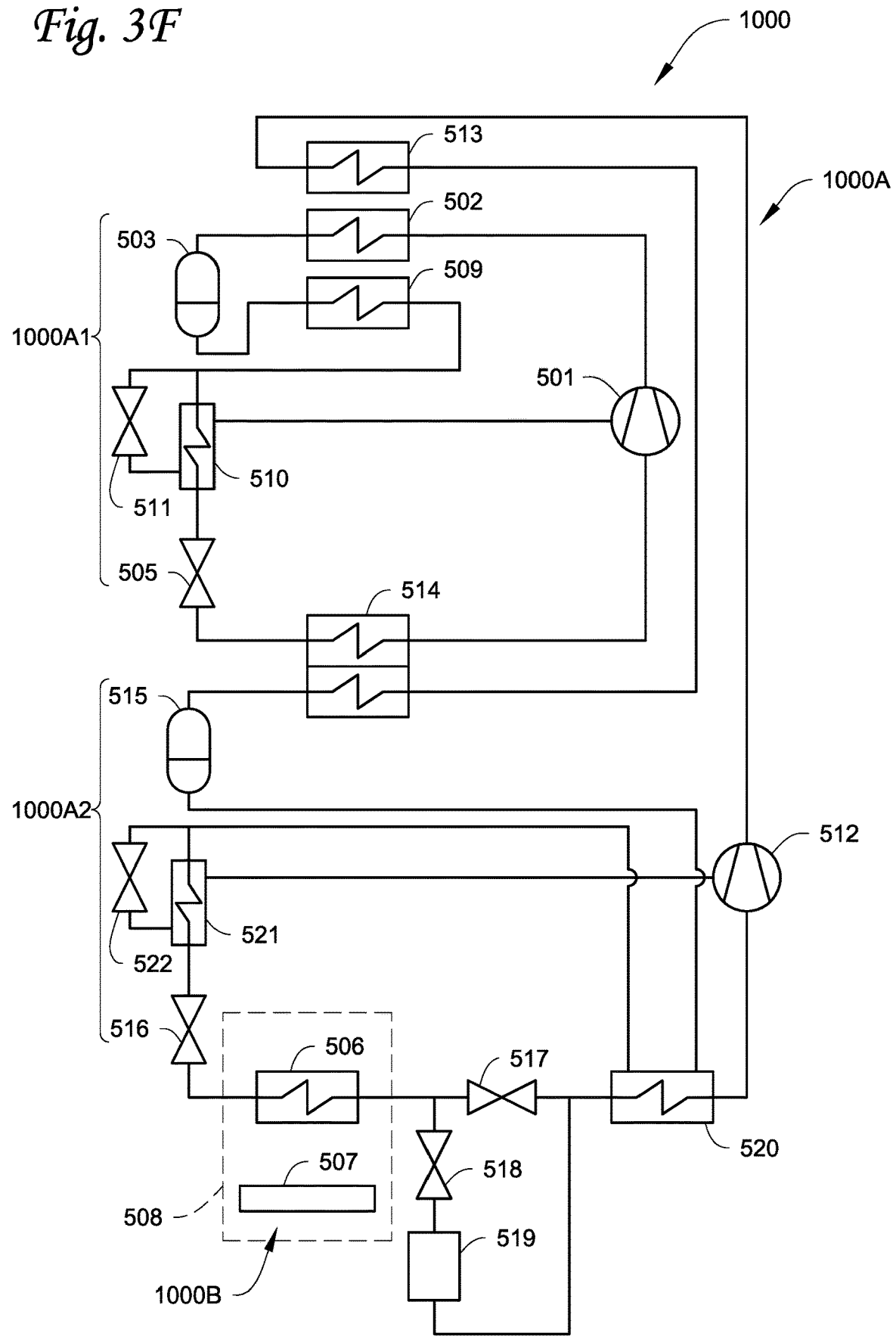
FIG. 3F is a schematic diagram of a transport climate control system that includes a primary climate control system, that includes a cascade climate control circuit with two economizers, in thermal communication with a secondary climate control system, according to an embodiment.

FIG. 3F is a schematic diagram of a transport climate control system 1000 that includes a primary climate control system 1000A and a secondary climate control system 1000B. The primary climate control system 1000A and the secondary climate control system 1000B are in thermal communication with the climate controlled space 508 configured to contain a cargo (not shown).

The primary climate control system 1000A includes a first heat transfer circuit 1000A1 and a second transfer circuit 1000A2. In an embodiment, the first heat transfer circuit 1000A1 can alternatively be referred to as the primary heat transfer circuit 1000A1, the high side heat transfer circuit 1000A1, the condensing side heat transfer circuit 1000A1, the stage two heat transfer circuit 1000A1, or the like. In an embodiment, the second heat transfer circuit 1000A2 can alternatively be referred to as the low side heat transfer circuit 1000A2, the evaporating side heat transfer circuit 1000A2, or the like. The first heat transfer circuit 1000A1 is in thermal communication with the second heat transfer circuit 1000A2.

The first heat transfer circuit 1000A1 can be similar to, for example, the first heat transfer circuit 800A1 of as shown in FIG. 3D and described above. The second heat transfer circuit 1000A2 can be similar to, for example, the second heat transfer circuit 900A2 of as shown in FIG. 3e and described above.

According to an embodiment, the working fluid can be R134a, R513A, R1234yf, R1234ze, or R515B for the first heat transfer circuit 1000A1 and R23, R508B, or LFR5A for the second heat transfer circuit 1000A2.

The secondary climate control system 1000B can provide backup or additional cooling capacity for the climate controlled space 508 through an ultra-low temperature phase changing medium 507 releasing or absorbing thermal energy from the climate controlled space 508.

The ultra-low temperature phase changing medium 507 can be an ultra-low temperature phase changing medium that is configured to absorb thermal energy from a surrounding environment when it changes from one phase to another. In some embodiments, the ultra-low temperature phase changing medium 507 can be a sublimating/evaporative medium such as, for example, dry ice, liquid nitrogen, etc.

Figure 4A:
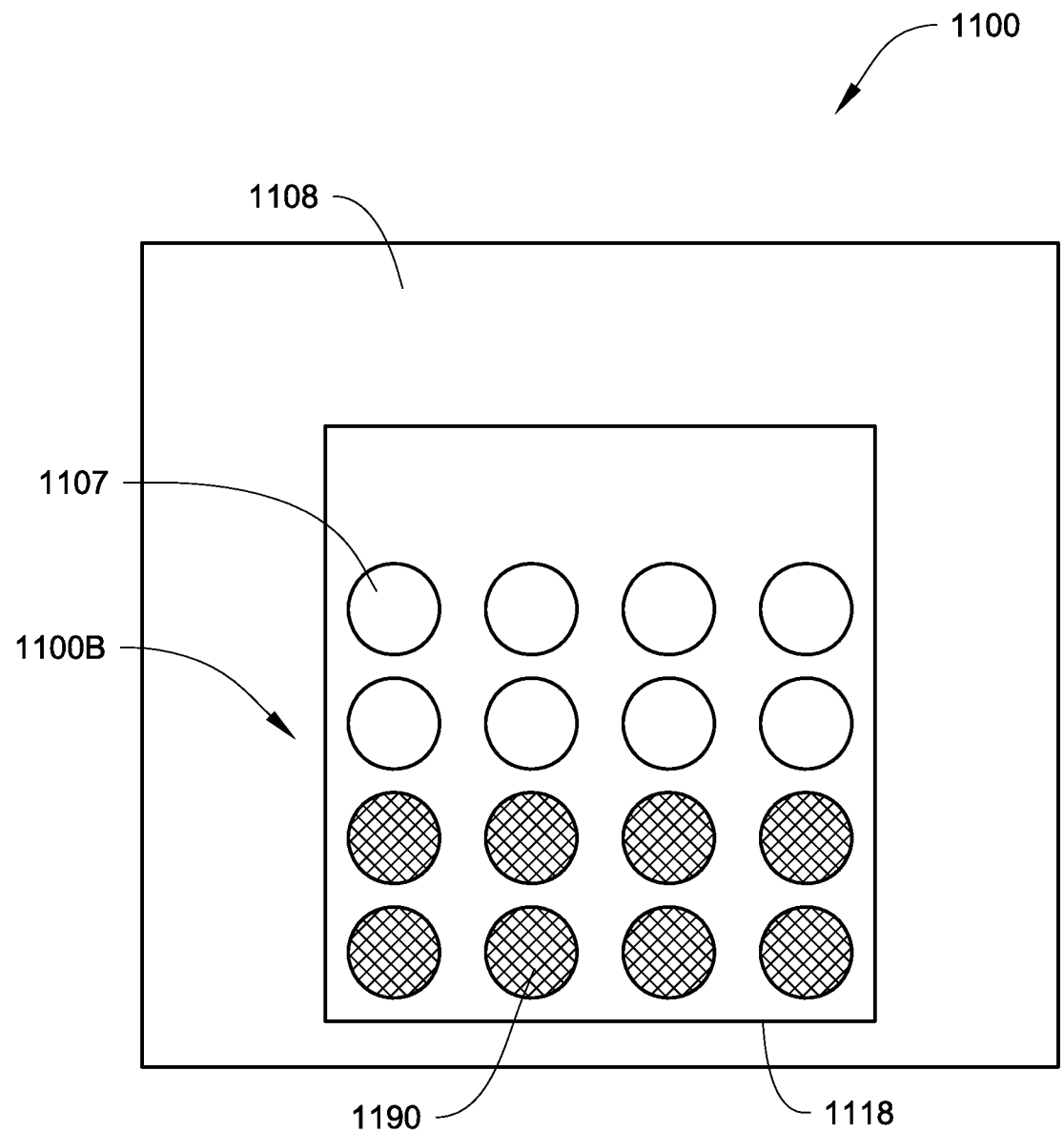
FIG. 4A illustrates a climate controlled space of a transport unit, according to an embodiment.

FIG. 4A illustrates a climate controlled space 1108 of a transport unit 1100, according to an embodiment. As shown in FIG. 4A, the transport unit 1100 includes a secondary climate control system 1100B disposed within the climate controlled space 1108, an enclosure 1118 of a cargo 1190 with an ultra-low temperature phase changing medium 1107. It will be appreciated that in some embodiments, the transport unit 1100 can also include one or more components of a primary climate control system.

A primary climate control system (not shown) can provide all or a portion of cooling capacity for the climate controlled space 1108. The primary climate control system can be, for example, any of the primary control systems 500A, 600A, 700A, 800A, 900A, and 1000A as shown and described in FIGS. 3A-3F.

The secondary climate control system 1100B can provide backup or additional cooling capacity for the climate controlled space 1108 through the ultra-low temperature phase changing medium 1107 releasing or absorbing thermal energy from the climate controlled space 1108.

The ultra-low temperature phase changing medium 1107 can be configured to absorb thermal energy from a surrounding environment when it changes from one phase to another. In some embodiments, the ultra-low temperature phase changing medium 1107 can be a sublimating/evaporative medium such as, for example, dry ice, liquid nitrogen, etc.

The enclosure 1118 can enclose a space for housing the cargo 1190. According to one embodiment, the enclosure 1118 fully encloses the space for housing the cargo 1190. In another embodiment, the enclosure 1118 can partially enclose the space for containing the cargo 1190. The enclosure 1118, for example, can be a packaging, a box, an insulated box, a tray, a specialized transport packaging for pharmaceuticals and vaccines, etc.

As illustrated in FIG. 4A, the ultra-low temperature phase changing medium 1107 is enclosed within the enclosure 1118 with the cargo 1190. The ultra-low temperature phase changing medium 1107 can continue to provide cooling capacity after the enclosure 1118 is removed from the climate controlled space 1118, and the cargo 1190 can maintain the required temperature for a period of time after removal from the transport unit 1100 and, for example, before the cargo 1190 is consumed or relocated to another climate controlled space. In some embodiments, the ultra-low temperature phase changing medium 1107 can provide cooling capacity when, for example, the primary cooling system is not capable of providing sufficient cooling capacity to reach an ultra-low temperature range within the climate controlled space 1108.

Figure 4B:
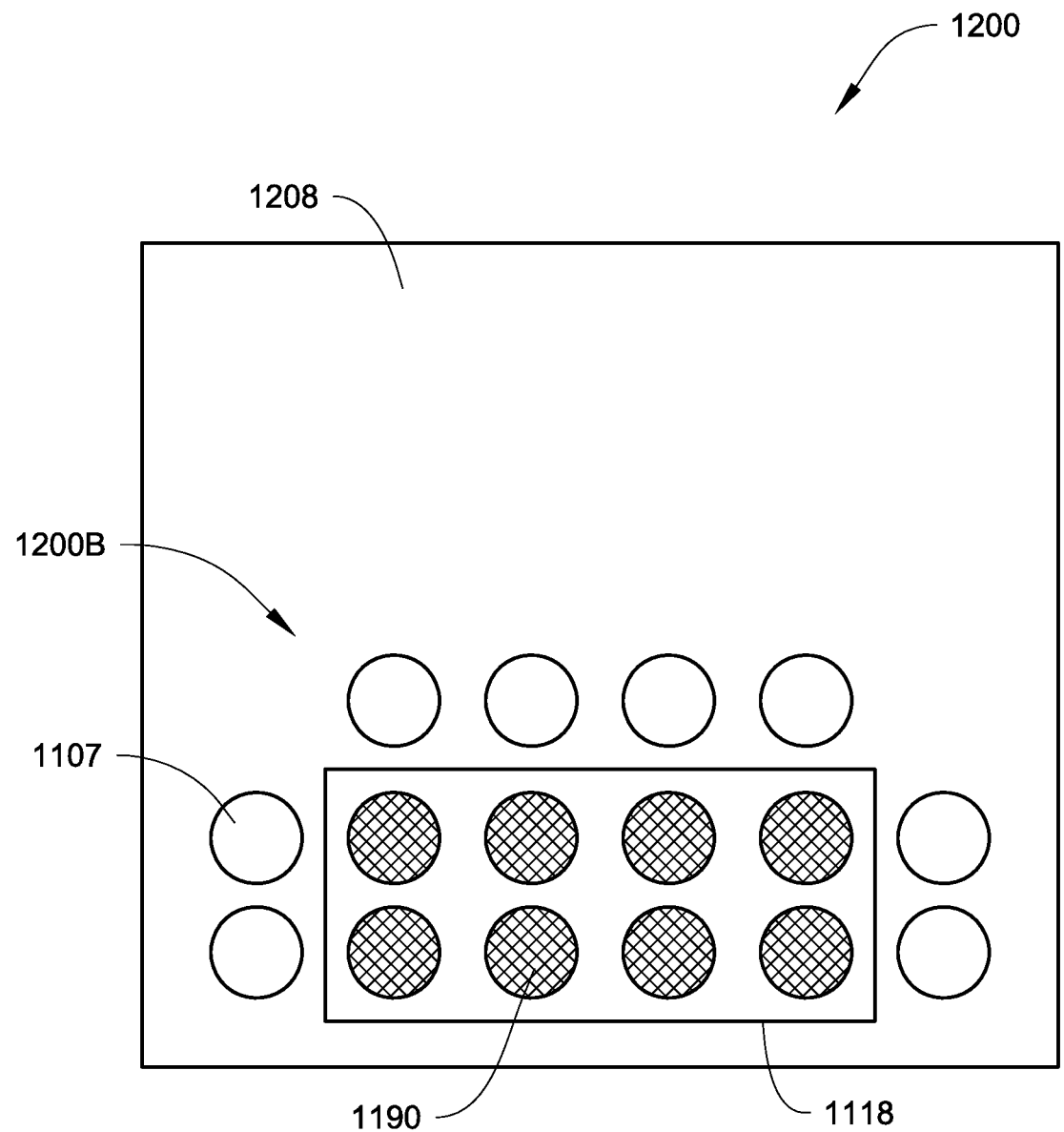
FIG. 4B illustrates a climate controlled space of a transport unit, according to another embodiment.

FIG. 4B illustrates a climate controlled space 1208 of a transport unit 1200, according to another embodiment. As shown in FIG. 4B, the transport unit 1200 includes a secondary climate control system 1200B disposed within the climate controlled space 1108, the enclosure 1118 of the cargo 1190 with an ultra-low temperature phase changing medium 1107. It will be appreciated that in some embodiments, the transport unit 1200 can also include one or more components of a primary climate control system.

A primary climate control system (not shown) can provide all or a portion of cooling capacity for the climate controlled space 1108. The primary climate control system can be, for example, any of the primary control systems 500A, 600A, 700A, 800A, 900A, and 1000A as shown and described in FIGS. 3A-3F.

The secondary climate control system 1200B can provide backup or additional cooling capacity for the climate controlled space 1108 through the ultra-low temperature phase changing medium 1107 releasing or absorbing thermal energy from the climate controlled space 1108.

The ultra-low temperature phase changing medium 1107 can be configured to absorb thermal energy from a surrounding environment when it changes from one phase to another. In some embodiments, the ultra-low temperature phase changing medium 1107 can be a sublimating/evaporative medium such as, for example, dry ice, liquid nitrogen, etc.

The enclosure 1118 can enclose a space for housing the cargo 1190. According to one embodiment, the enclosure 1118 fully encloses the space for containing the cargo 1190. In another embodiment, the enclosure 1118 can partially enclose the space for housing the cargo 1190. The enclosure 1118, for example, can be a packaging, a box, an insulated box, a tray, a specialized transport packaging for pharmaceuticals and vaccines, etc.

As illustrated in FIG. 4B, the ultra-low temperature phase changing medium 1107 is positioned outside the enclosure 1118. The ultra-low temperature phase changing medium 1107 can provide cooling capacity when, for example, the primary cooling system is not capable of providing sufficient cooling capacity to reach an ultra-low temperature range within the climate controlled space 1108. In an embodiment, the ultra-low temperature phase changing medium 1107 can be positioned both inside and outside the enclosure 1118.

Figure 5:
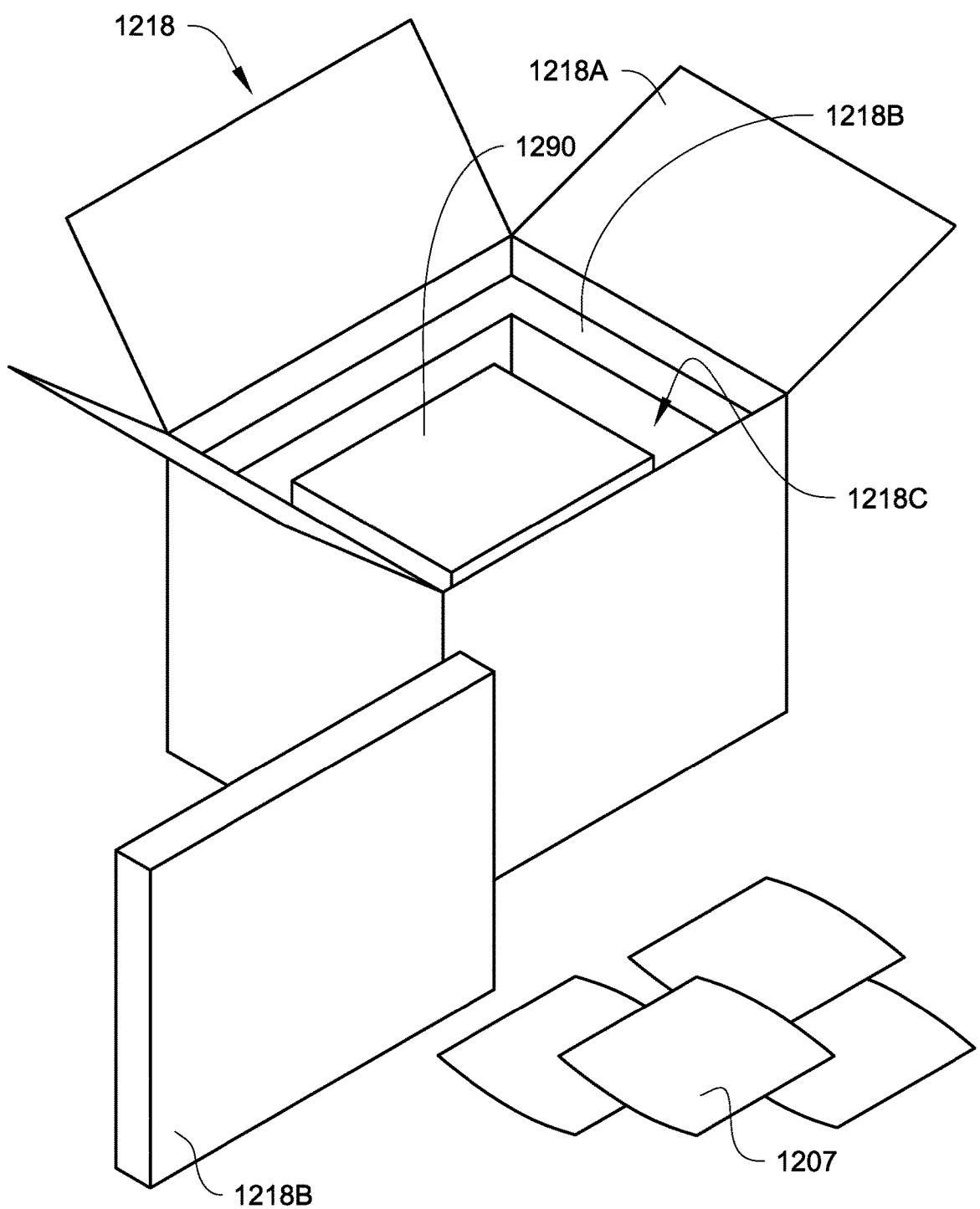
FIG. 5 illustrates an enclosure configured to house a cargo, according to an embodiment.

FIG. 5 illustrates an enclosure 1218 configured to house a cargo 1290, according to an embodiment. As shown in FIG. 5, the enclosure 1218 is an insulated box with a structural layer 1218A and an insulation layer 1218B. The cargo 1290 is housed within a space 1218C enclosed by the insulation layer 1218B. As illustrated in FIG. 5 a part of the insulation 1218B is moved aside to show the space 1218C and the cargo 1290 within the enclosure 1218. In an embodiment, the part of the insulation 1218B can be an insulating lid detachable from the insulation layer 1218B. An ultra-low temperature phase changing medium 1207 is illustrated to be outside of the enclosure 1218. It is appreciated that the ultra-low temperature phase changing medium 1207 can be placed within the space 1218C along with the cargo 1290 to provide backup or additional cooling capacity. It is also appreciated that the enclosure 1218 may be advantageous in maintaining the ultra-low temperature when the primary climate control system is not available. For example, the cargo 1290 can be a mRNA vaccine required to be kept within an ultra-low temperature range. The enclosure 1218 can maintain the ultra-low temperature for a predetermined period of time allowing the vaccine, for example, to be moved into freezer inside a hospital or be used before the ultra-low temperature phase changing medium 1207 is fully consumed.

Figure 6:
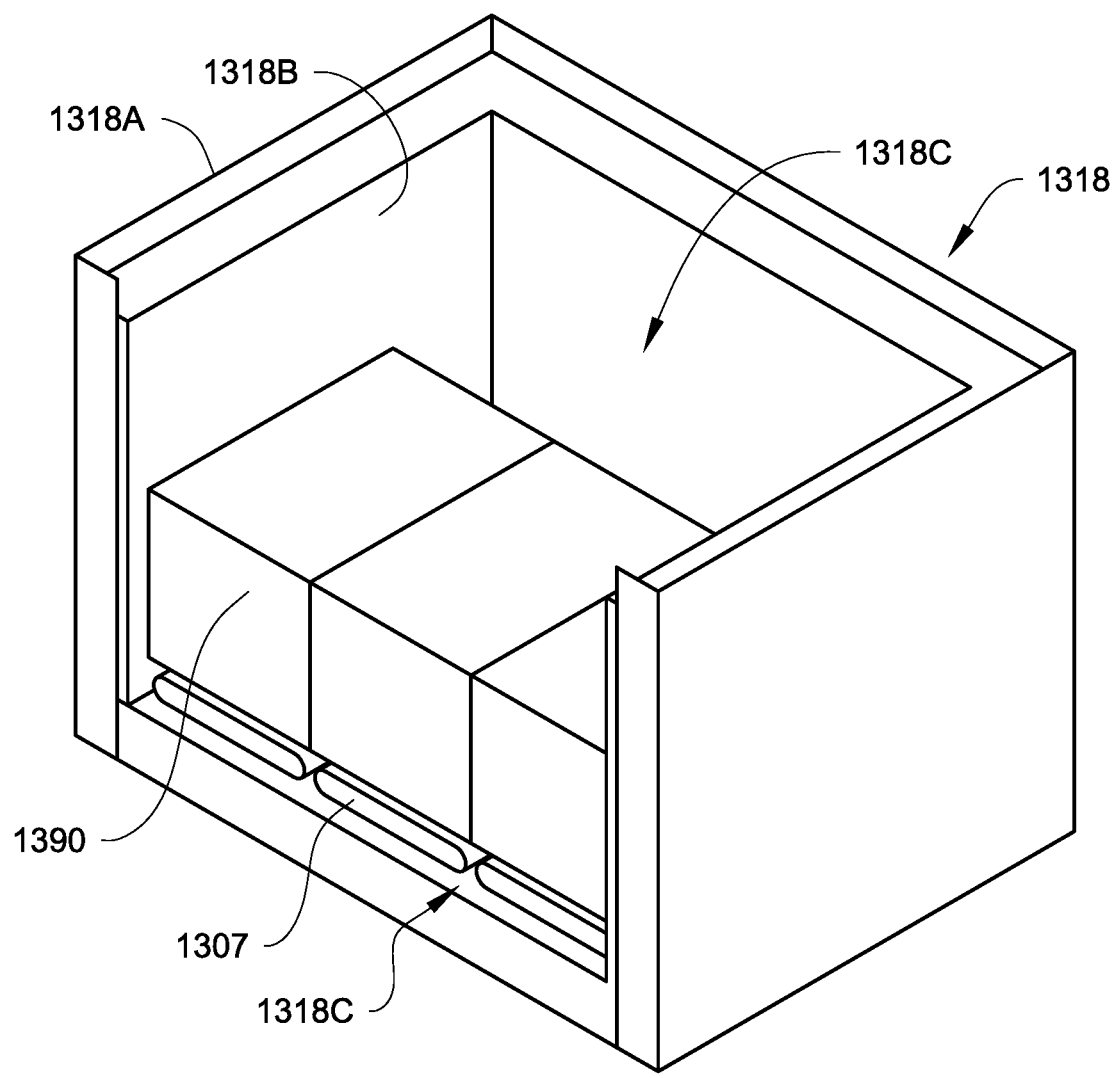
FIG. 6 illustrates an enclosure configured to house a cargo, according to another embodiment.

FIG. 6 illustrates an enclosure 1318 configured to house a cargo 1390, according to another embodiment. As shown in FIG. 6, the enclosure 1318 is an insulated box with a structural layer 1318A and an insulation layer 1318B. The cargo 1390 is housed within a space 1318C at least partially enclosed by the insulation layer 1318B. An ultra-low temperature phase changing medium 1307 is placed within the space 1318C along with the cargo 1390 to provide backup or additional cooling capacity. According to yet another embodiment, the cargo 1390 can be, for example, the enclosure 1218 housing the cargo 1290 as shown and described in FIG. 5.

Aspects. It is noted that any of aspects 1-12 can be combined with any one of aspects 13-20. Aspect 1. A transport climate control system configured to maintain an ultra-low temperature over an extended period of time, the transport climate control system comprising:
   a primary climate control system including a first compressor, a first condenser, a first expander, and a main evaporator that is configured to thermally communicate with a climate controlled space; and
   a secondary climate control system including an ultra-low temperature phase changing medium packaged inside or outside of an enclosure for a cargo,
   wherein the secondary climate control system is configured to thermally communicate with the climate controlled space, the primary climate control system, and the cargo to provide additional or back-up climate control capacity at the ultra-low temperature.

Aspect 2. The transport climate control system of aspect 1, wherein the primary climate control system includes a liquid receiver that:
   is configured to fluidly communicate with a working fluid passing through the main evaporator,
   is disposed on a working fluid flow path between the first condenser and the first expander, and
   is configured to contain the working fluid and manage demand fluctuations of the main evaporator.

Aspect 3. The transport climate control system of any of aspects 1 and 2, wherein the primary climate control system includes a suction-liquid heat exchanger that is configured to fluidly communicate with a working fluid passing through the main evaporator, is configured to be in thermal communication with the working fluid at a working fluid flow path between the main evaporator and the compressor, and is disposed on a working fluid flow path between the first condenser and the first expander.

Aspect 4. The transport climate control system of any of aspects 1-3, wherein the primary climate control system includes an economizer that is configured to fluidly communicate with a working fluid passing through the main evaporator, and is configured to be in thermal communication with the working fluid at a working fluid flow path upstream from the main evaporator.

Aspect 5. The transport climate control system of any of aspects 1-4, wherein the primary climate control system includes a sub-cooling heat exchanger that is configured to fluidly communicate with a working fluid passing through the main evaporator, and is configured to be in thermal communication with the first condenser.

Aspect 6. The transport climate control system of any of aspects 1-5, wherein the ultra-low temperature is at or below −30° C.

Aspect 7. The transport climate control system of any of aspects 1-6, wherein in the primary climate control system includes a second compressor, a second expander, and a cascade heat exchanger, wherein the second compressor, the cascade heat exchanger, and the second expander are configured to fluidly communicate with a working fluid passing through the main evaporator, the cascade heat exchange is configured to be in thermal communication with a working fluid passing through the first compressor, and the first compressor, the first expander, and the first condenser are configured to fluidly communicate with the working fluid passing through the first compressor.

Aspect 8. The transport climate control system of aspect 7, wherein the primary climate control system includes at least one of:

a first liquid receiver fluidly communicates with a working fluid passing through the first compressor, the first liquid received configured to contain the working fluid passing through the first compressor and mange demand fluctuations of the cascade heat exchanger, and a second liquid receiver fluidly communicates with a working fluid passing through the main evaporator, the second liquid receiver configured to contain the working fluid passing through the first compressor and mange demand fluctuations of the main evaporator.

Aspect 9. The transport climate control system of any of aspects 7 and 8, wherein the primary climate control system includes at least one of:

a first economizer heat exchanger and a first economizer expander that fluidly communicate with the first compressor and are upstream of the cascade heat exchanger, the first economizer configured to precool a working fluid passing through the cascade heat exchanger; and a second economizer heat exchanger and a second economizer expander that fluidly communicate with the second compressor and are upstream of the main evaporator, the second economizer configured to precool a working fluid passing through the main evaporator.

Aspect 10. The transport climate control system of any of aspects 7-9, wherein the primary climate control system further includes at least one of:

a sub-cooling heat exchanger in fluid communication via a working fluid passing the first compressor, configured to remove thermal energy from the working fluid; and a de-superheating heat exchanger in fluid communication via a working fluid passing the main evaporator, configured to remove thermal energy from the working fluid.

Aspect 11. The transport climate control system of any of aspects 7-9, further comprising:

a second economizer heat exchanger, configured to pre-cool a working fluid passing the main evaporator; or a buffer system that includes a buffer system tank, a first buffer system valve, and a second buffer system valve, wherein the buffer system tank is upstream of the second economizer heat exchanger and downstream of the first buffer system valve and the second buffer system valve.

Aspect 12. The transport climate control system of any of aspects 1-11, wherein the ultra-low temperature phase changing medium is at least one of liquid nitrogen and dry ice.

Aspect 13. A method for maintaining climate control of a climate controlled space over an extended period of time at an ultra-low temperature, the method comprising:

running a primary climate control system that includes a first compressor, a first condenser, a first expander, and a main evaporator that is configured to thermally communicate with the climate controlled space in order to provide cooling capacity to the climate controlled space; and running a secondary climate control system that includes an ultra-low temperature phase changing medium packaged with an enclosure for housing a cargo in order to provide additional or back-up cooling capacity to the climate controlled space at the ultra-low temperature, wherein the primary climate control system and the secondary climate control system are configured to thermally communicate with the climate controlled space.

Aspect 14. The method of aspect 13, further comprising:

dampening fluctuating pressures affecting the first compressor by storing, in a first liquid receiver, a portion of a working fluid passing through the main evaporator, the first liquid being disposed on a flow path between the first condenser and the first expander.

Aspect 15. The method of any of aspects 13-14, further comprising:

removing thermal energy from a working fluid upstream from the main evaporator by thermally communicating the working fluid upstream from the main evaporator with the working fluid downstream from the main evaporator via a suction-liquid refrigerant heat exchanger.

Aspect 16. The method of any of aspects 13-15, further comprising:

removing thermal energy upstream of the first expander by:

diverging a portion of the working fluid upstream of the first expander to obtain a diverged portion of the working fluid, expanding the diverged portion of the working fluid to obtained a cooled diverged portion of the working fluid, cooling a remaining portion of the working fluid upstream of the first expander using the cooled diverged portion of the working fluid via a first economizer; or removing thermal energy upstream of a second expander by:
  diverging a portion of the working fluid upstream of the second expander to obtain a diverged portion of the working fluid,
  expanding the diverged portion of the working fluid to obtained a cooled diverged portion of the working fluid,
  cooling a remaining portion of the working fluid upstream of the second expander using the cooled diverged portion of the working fluid via a second economizer.

Aspect 17. The method of any of aspects 13-16, further comprising:
  removing thermal energy in a working fluid passing through a first compressor by exchanging thermal energy in a sub-cooling heat exchanger with a second working fluid disposed on a working fluid side of the sub-cooling heat exchanger; or
  removing thermal energy in a working fluid passing through a second compressor by exchanging thermal energy in a de-superheating heat exchanger with the second working fluid dispose on a working fluid side of the de-superheating heat exchanger.

Aspect 18. The method of aspect 13-17, further comprising:
  stabilizing pressure and temperature during a start-up operation by closing a first buffer control valve directing a portion of the working fluid into a buffer system tank; and
  bypassing the buffer system after the start-up operation by opening the first buffer control valve and closing the second buffer control valve.

Aspect 19. The method of any of aspects 13-18, wherein the ultra-low temperature phase changing medium is at least one of liquid nitrogen and dry ice.

Aspect 20. The method of any of aspects 13-19, wherein The ultra-low temperature is at or below −30° C.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A transport climate control system configured to maintain an ultra-low temperature over an extended period of time, the transport climate control system comprising:
  a primary climate control system including a first compressor, a first condenser, a first expander, and a main evaporator that is configured to thermally communicate with a climate controlled space; and
  a secondary climate control system including an ultra-low temperature phase changing medium packaged inside or outside of an enclosure for a cargo,
  wherein the secondary climate control system is configured to thermally communicate with the climate controlled space, the primary climate control system, and the cargo to provide additional or back-up climate control capacity at the ultra-low temperature,
  wherein the ultra-low temperature is between −40° C. to −80° C., and
  wherein the ultra-low temperature phase changing medium is packaged such that the ultra-low temperature phase changing medium is arranged to dissipate in the climate controlled space.

2. The transport climate control system of claim 1, wherein the primary climate control system includes a liquid receiver that:
  is configured to fluidly communicate with a working fluid passing through the main evaporator,
  is disposed on a working fluid flow path between the first condenser and the first expander, and
  is configured to contain the working fluid and manage demand fluctuations of the main evaporator.

3. The transport climate control system of claim 1, wherein the primary climate control system includes a suction-liquid heat exchanger that
  is configured to fluidly communicate with a working fluid passing through the main evaporator,
  is configured to be in thermal communication with the working fluid at a working fluid flow path between the main evaporator and the compressor, and
  is disposed on the working fluid flow path between the first condenser and the first expander.

4. The transport climate control system of claim 1, wherein the primary climate control system includes an economizer that
  is configured to fluidly communicate with a working fluid passing through the main evaporator, and
  is configured to be in thermal communication with the working fluid at a working fluid flow path upstream from the main evaporator.

5. The transport climate control system of claim 1, wherein the primary climate control system includes a sub-cooling heat exchanger that
  is configured to fluidly communicate with a working fluid passing through the main evaporator, and
  is configured to be in thermal communication with the first condenser.

6. The transport climate control system of claim 1, wherein in the primary climate control system includes a second compressor, a second expander, and a cascade heat exchanger, wherein
  the second compressor, the cascade heat exchanger, and the second expander are configured to fluidly communicate with a working fluid passing through the main evaporator,
  the cascade heat exchange is configured to be in thermal communication with the working fluid passing through the first compressor, and
  the first compressor, the first expander, and the first condenser are configured to fluidly communicate with the working fluid passing through the first compressor.

7. The transport climate control system of claim 1, wherein the ultra-low temperature phase changing medium is at least one of liquid nitrogen and dry ice.

8. The transport climate control system of claim 1, wherein the ultra-low temperature phase changing medium is packaged such that the ultra-low temperature phase changing medium is arranged to provide cooling capacity externally of the climate controlled space.

9. The transport climate control system of claim 1, wherein the ultra-low temperature phase changing medium is packaged such that the ultra-low temperature phase changing medium is arranged to provide cooling capacity by evaporation or sublimation.

10. The transport climate control system of claim 1, wherein
the primary climate control system includes a climate control circuit configured to provide climate control within the climate controlled space, and
the ultra-low temperature phase changing medium is arranged fluidly separate from the climate control circuit.

11. A method for maintaining climate control of a climate controlled space over an extended period of time at an ultra-low temperature, the method comprising:
running a primary climate control system that includes a first compressor, a first condenser, a first expander, and a main evaporator that is configured to thermally communicate with the climate controlled space in order to provide cooling capacity to the climate controlled space;
running a secondary climate control system that includes an ultra-low temperature phase changing medium packaged inside or outside of an enclosure for housing a cargo in order to provide additional or back-up cooling capacity to the climate controlled space at the ultra-low temperature; and
packaging the ultra-low temperature phase changing medium such that the ultra-low temperature phase changing medium is arranged to dissipate in the climate controlled space,
wherein the primary climate control system and the secondary climate control system are configured to thermally communicate with the climate controlled space, and
wherein the ultra-low temperature is between −40° C. to −80° C.

12. The method of claim 11, further comprising:
dampening fluctuating pressures affecting the first compressor by storing, in a first liquid receiver, a portion of a working fluid passing through the main evaporator, the first liquid being disposed on a flow path between the first condenser and the first expander.

13. The method of claim 11, further comprising:
removing thermal energy from a working fluid upstream from the main evaporator by thermally communicating the working fluid upstream from the main evaporator with the working fluid downstream from the main evaporator via a suction-liquid refrigerant heat exchanger.

14. The method of claim 11, further comprising:
removing thermal energy upstream of the first expander by:
diverging a first portion of a working fluid upstream of the first expander to obtain a first diverged portion of the working fluid,
expanding the first diverged portion of the working fluid to obtained a first cooled diverged portion of the working fluid,
cooling a remaining portion of the working fluid upstream of the first expander using the first cooled diverged portion of the working fluid via a first economizer; or
removing thermal energy upstream of a second expander by:
diverging a second portion of the working fluid upstream of the second expander to obtain a second diverged portion of the working fluid,
expanding the second diverged portion of the working fluid to obtained a second cooled diverged portion of the working fluid,
cooling a remaining portion of the working fluid upstream of the second expander using the second cooled diverged portion of the working fluid via a second economizer.

15. The method of claim 11, further comprising:
stabilizing pressure and temperature during a start-up operation by closing a first buffer control valve directing a portion of a working fluid into a buffer system tank; and
bypassing the buffer system after the start-up operation by opening the first buffer control valve and closing a second buffer control valve.

16. The method of claim 11, wherein the ultra-low temperature phase changing medium is at least one of liquid nitrogen and dry ice.

17. The method of claim 11, further comprising:
the ultra-low temperature phase changing medium providing cooling capacity externally of the climate controlled space.

18. The method of claim 11, further comprising:
the ultra-low temperature phase changing medium providing cooling capacity by evaporation or sublimation.

* * * * *